United States Patent [19]

Shimokawa

[11] Patent Number: 5,613,143
[45] Date of Patent: Mar. 18, 1997

[54] PROGRAMMABLE CONTROLLER FOR HIGH-SPEED ARITHMETIC OPERATIONS

[75] Inventor: Yoshiyuki Shimokawa, Tokyo, Japan

[73] Assignee: Kabushiki Kaisha Toshiba, Kawasaki, Japan

[21] Appl. No.: 428,839

[22] Filed: Apr. 25, 1995

Related U.S. Application Data

[63] Continuation of Ser. No. 966,011, Oct. 23, 1992, abandoned.

[30] Foreign Application Priority Data

Oct. 25, 1991 [JP] Japan .................... 3-279704

[51] Int. Cl.$^6$ ............... G06F 9/26; G06F 9/00; G06F 13/00
[52] U.S. Cl. ............ 395/800; 364/259.9; 364/262.4; 364/DIG. 1
[58] Field of Search ..................... 395/800, 425, 395/400, 375; 364/DIG. 1

[56] References Cited

U.S. PATENT DOCUMENTS

| | | | |
|---|---|---|---|
| 3,831,148 | 8/1974 | Greenwald et al. | 395/375 |
| 3,930,232 | 12/1975 | Wallach et al. | 395/500 |
| 4,162,519 | 7/1979 | Hanewinkel | 395/421.02 |
| 4,270,184 | 5/1981 | Shimokawa | 364/900 |
| 4,274,138 | 6/1981 | Shimokawa | 364/200 |
| 4,648,068 | 3/1987 | Ninnemann et al. | 395/325 |
| 4,858,105 | 8/1989 | Kuriyama et al. | 364/200 |
| 5,121,490 | 6/1992 | Ueda | 395/425 |
| 5,265,213 | 11/1993 | Weiser et al. | 395/375 |
| 5,410,659 | 5/1995 | Saitou et al. | 395/375 |
| 5,423,012 | 6/1995 | Sato et al. | 395/375 |

OTHER PUBLICATIONS

1991 International Conference on Industrial Electronics, Control and Instrumentation, Yoshiyuki Shimokawa, et al., pp. 884–889, "A High–Performance VLSI Chip Of Programmable Controller And Is Language For Instrumentation And Electric Control".

*Primary Examiner*—Meng-Ai T. An
*Attorney, Agent, or Firm*—Oblon, Spivak, McClelland, Maier & Neustadt, P.C.

[57] ABSTRACT

A programmable controller includes a microprogram memory for holding a microinstruction, a code memory for holding each operation instruction for executing an operation as one word of instruction words having the same bit length, a data memory for holding the operation data, and an integrated central processing unit for executing the operation on the basis of the instructions from the code and data memories. The central processing unit includes a sequencer, a decoder, a program counter circuit, an instruction register circuit, a data memory control circuit, an address matching circuit, a control register circuit, a bit operation circuit, a register circuit, a fixed-point operation circuit, a floating-point operation circuit, and a multiplier circuit.

6 Claims, 15 Drawing Sheets

F I G. 2

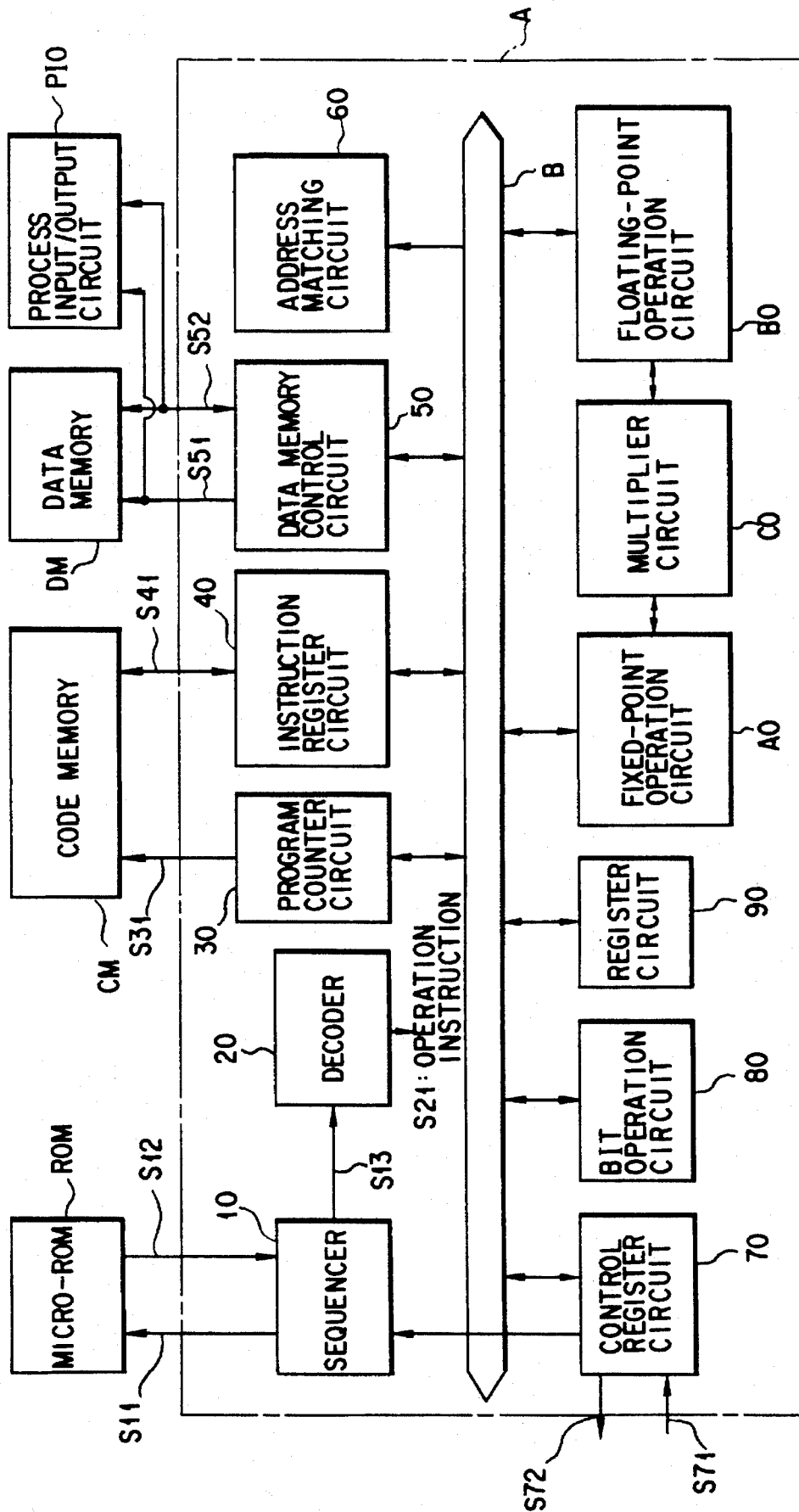
F I G. 3

| AD-DRESS | GRAPHIC PATTERN | INSTRUCTION WORD | | CONTENT OF OPERATION |
|---|---|---|---|---|
| 0 | ⊢⊢ | B9 | ×1 | MCFF→LS↓   MCFF∧×1→BR |
| 1 | ⊣⊢ | B1 | ×2 | BR∧×2→BR |
| 2 | └⊢ | B5 | ×5 | BR→RS↓   LS∧×5→BR, LS↑ |
| 3 | ┌⊢┘ | B4 | ×6 | BR→LS↓, BR∧×6  VRS→BR, RS↑ |
| 4 | ⊣/⊢ | BN1 | ×3 | BR∧$\overline{×3}$→BR |
| 5 | ┌⊢ | B3 | ×4 | BR→LS↓, BR∧×4→BR |
| 6 | ⊣( )⊢ | BC1 | ×11 | BR→×11 |
| 7 | └⊢ | B11 | ×7 | LS∧×7→BR, LS↑ |
| 8 | ⊣( )⊢ | BC1 | ×12 | BR→×12 |
| 9 | └⊢ | B11 | ×8 | LS∧×8→BR, LS↑ |
| 10 | ⊣( )⊢ | BC1 | ×13 | BR→×13 |

| | | | |
|---|---|---|---|
| 20 | ▷F / D2 | LDF D2 | D2→WRS↓ |
| 21 | ▷F / D4 | LDF D4 | D4→WRS↓ |
| 22 | ▷F / D6 | LDF D6 | D6→WRS↓ |
| 23 | +F | ADDF, 1 | ① 1→CNTR<br>(WRS−1) + (WRS) → (WRS−1)<br>WRS↑<br>CNTR−1→CNTR<br>② (WRS−1) + (WRS) → (WRS−1)<br>WRS↑ |
| 24 | ▷F / D8 | LDF D8 | D8→WRS↓ |
| 25 | −F | SUBF | (WRS−1) − (WRS) → (WRS−1)<br>WRS↑ |
| 26 | 10.0 | LDIF 10.0 | 10.0→WRS↓ |
| 27 | ×F | MULF, 0 | 0→CNTR<br>(WRS−1) × (WRS) → (WRS−1)<br>WRS↑ |
| 28 | ─•→ | WLS1 | WRS→WLS↓ |
| 29 | 1000.0 | LDIF 1000.0 | 1000.0→WRS↓ |
| 30 | 0.0 | LDIF 0.0 | 0.0→WRS↓ |
| 31 | LMF | LMT | IF (WRS−1) ≤ (WRS−2) ≤ (WRS)<br>THEN  WRS↑↑<br>ELSE<br>  IF (WRS−1) > (WRS−2)<br>  THEN (WRS−1) → (WRS−2)<br>  ELSE (WRS) → (WRS−2)<br>WRS↑↑ |
| 32 | ▷F / D10 | STF D10 | WRS→D10, WRS↑ |
| 33 | ↑ D10 | WLS3 | WLS↑→WRS↓ |
| 34 | +/−F | SINV | − (WRS) → (WRS) |
| 35 | ▷F / D12 | STFD12 | WRS→D12, WRS↑ |

F I G. 6

```
IF      W10 + W11 > W12
        THEN    W15 := W13 × W14
        ELSE    W15 := (W13 − W14) × 10
FI
```

ADDRESS

40 [IF]    IF

41 [▷]    LD W10      W10→WRS↓
    W10

42 [▷]    LD W11      W11→WRS↓
    W11

43 [+]    ADD, 0      (WRS) + (WRS−1) → (WRS−1)

WRS↑

44 [▷]    LD W12      W12→WRS↓
    W12

45 [>]    GT          IF (WRS−1) > (WRS)

THEN    1→BR

ELSE    0→BR

46 [THEN]   THEN 51     IF BR=1

THEN $\overline{BR}$→S1FF

ELSE $\overline{BR}$→S1FF

JUMP TO 51

F I G. 8

ADDRESS

| | | | |
|---|---|---|---|
| 47 | ▷ W13 | LD W13 | W13→WRS↓ |
| 48 | ▷ W14 | LD W14 | W14→WRS↓ |
| 49 | × | MPL, 0 | (WRS) × (WRS−1) → (WRS) |
| | | | WRS↑ |
| 50 | ▷ W15 | ST W15 | WRS→W15, WRS↑ |
| 51 | ELSE | ELSE 58 | IF S1FF=0 |
| | | | THEN 1→S1FF |
| | | | JUMP TO 58 |
| | | | ELSE 0→S1FF |
| 52 | ▷ W13 | LD W13 | W13→WRS↓ |
| 53 | ▷ | LD W14 | W14→WRS↓ |
| 54 | − | SUB | (WRS−1) − (WRS) → (WRS−1) |
| | | | WRS↑ |
| 55 | 10 | LDI 10 | 10→WRS↓ |
| 56 | × | MPL, 0 | (WRS−1) × (WRS) → (WRS−1) |
| | | | WRS↑ |
| 57 | ▷ W15 | ST W15 | WRS→W15, WRS↑ |
| 58 | FI | FI | 0→S1FF |

FIG. 9

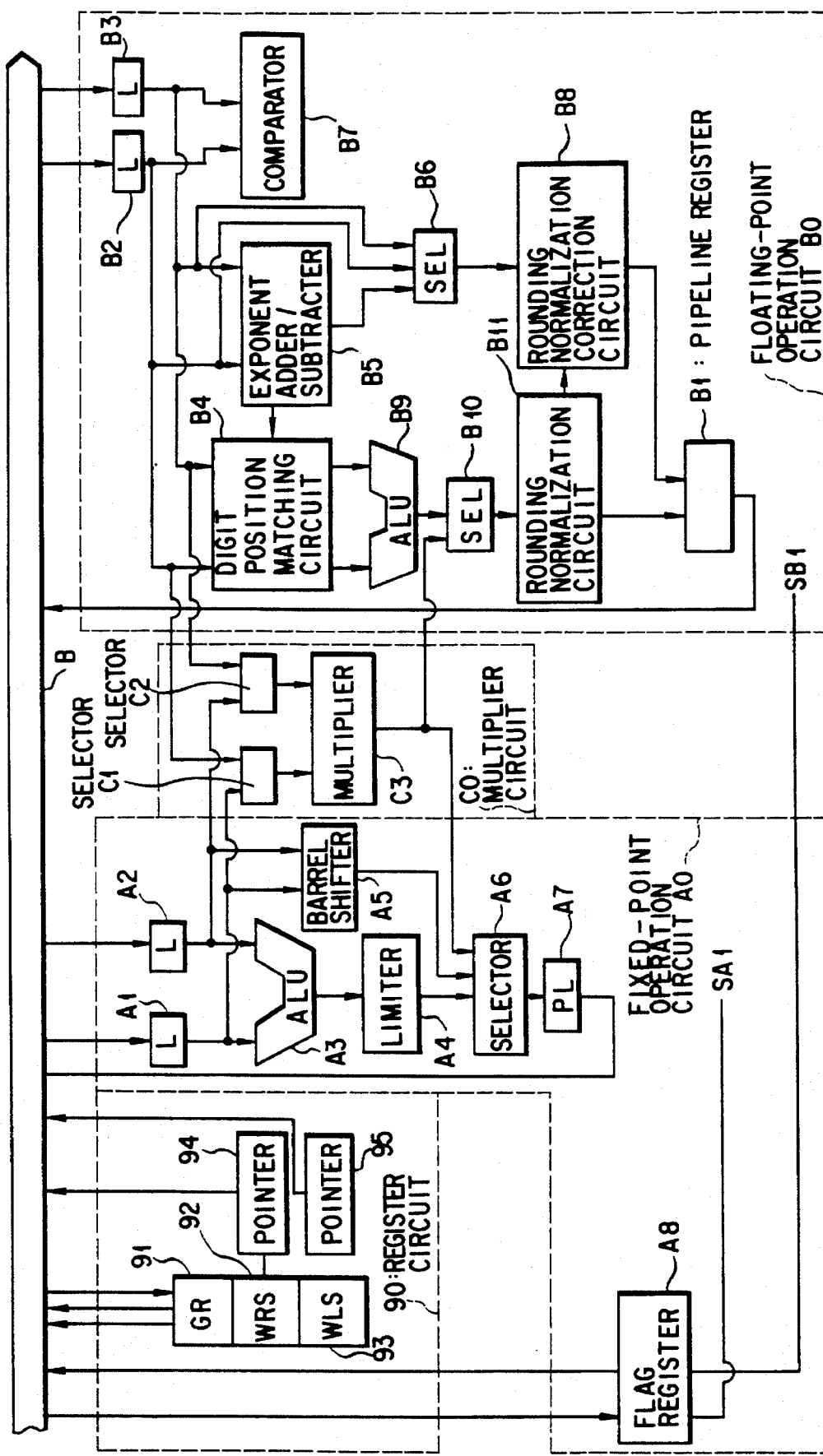
F I G. 13

| TIME | t1 | t2 | t3 | t4 | t5 | t6 | t7 | t8 | t9 | t10 |
|---|---|---|---|---|---|---|---|---|---|---|
| APC | 0 | 1 | 2 | 3 | 4 | 4 | 5 | 5 | 5 | 6 |
| BPC |  | 0 | 1 | 2 | 3 | 3 | 4 | 5 | 5 | 5 |
| PC |  |  | 0 | 1 | 2 | 2 | 3 | 4 | 5 | 5 |
| DPC |  |  |  | 0 | 1 | 1 | 2 | 3 | 4 | 4 |
| IA |  | 0 | 1 | 2 | 3 | 4 | 4 | NOP | NOP | 5 |
| IB |  |  | 0 | 1 | 2 | 3 | 3 | 4 | NOP | NOP |
| IR |  |  | 2 | 0 | 1 | 2 | 2 | 3 | 4 | 6 |
| ID |  |  |  | 3 | 4 | 1 | 5 | 5 | 5 |  |
| CODE BUS (S31, S41) | B9×1 | B1×2 | B5×5 | B4×6 | BN1×3 |  | 3 |  | B3×4 | BC1×11 |
| DATA BUS (S51, S52) |  |  | ×1 | ×2 | 2 | ×5 | ×6 | ×3 | NOP | NOP |
| BIT OPERATION |  |  |  | B9 | B1 |  | B5 | B4 | 4 |  |
| MICROBUS (S11, S12) |  | 0 | 1 | 2 | 3 | 3 | 4 | 3 | BN1 | 5 |

FIG. 14

| TIME | t1 | t2 | t3 | t4 | t5 | t6 | t7 | t8 | t9 | t10 | t11 | t12 | t13 |
|---|---|---|---|---|---|---|---|---|---|---|---|---|---|
| APC | 22 | 23 | 24 | 25 | 25 | 25 | 25 | 26 | 27 | 27 | 28 | 29 | 29 |
| BPC | 21 | 22 | 23 | 24 | 24 | 24 | 24 | 25 | 26 | 26 | 27 | 28 | 28 |
| PC  | 20 | 21 | 22 | 23 | 23 | 23 | 23 | 24 | 25 | 25 | 26 | 27 | 27 |
| DPC | 19 | 20 | 21 | 22 | 22 | 22 | 22 | 23 | 24 | 24 | 25 | 26 | 26 |
| IA  |    |    |    |    | 25 | 25 | 25 | 25 |    |    |    |    |    |
| IB  | 21 | 22 | 23 | 24 | 24 | 24 | 24 | 25 | 26 | 26 | 27 | 28 | 29 |
| IR  | 20 | 21 | 22 | 23 | 23 | 23 | 23 | 24 | 25 | 25 | 26 | 27 | 28 |
| ID  | 19 | 20 | 21 | 22 | 22 | 22 | 22 | 23 | 24 | 24 | 25 | 26 | 27 |
| CODE BUS (S31,S41) | LDF D6 | ADDF,1 | LDF D8 | SUBF |  |  |  | LDIF10.0 | MULF0 |  | MLS1 | LDIF1000.0 |  |
| DATA BUS (S51,S52) | 20 D2 | 21 D4 | 22 D6 | 25 |  |  |  | 24 D8 | 27 |  | 28 | 29 |  |
| OPERATION |  |  | 23-1 | 23-1 | 23-2 | 23-1 | 23-2 | 25-1 | 25-1 | 25-2 | 26 | 27-1 | 27-2 |
| MICROBUS (S11,S12) | 21 | 22 | 23-1 | 23-2 | 23-1 | 23-2 | 24 | 25-1 | 25-2 | 26 | 27-1 | 27-2 | 28 |

FIG. 15

PROGRAMMABLE CONTROLLER FOR HIGH-SPEED ARITHMETIC OPERATIONS

This application is a Continuation of application Ser. No. 07/966,011, filed on Oct. 23, 1992, now abandoned.

BACKGROUND OF THE INVENTION

1. Field of the Invention

The present invention relates to a programmable controller used in a measurement control system and any other various sequence control systems and, more particularly, to a high-performance programmable controller having a simple arrangement and achieving high-speed arithmetic operations.

2. Description of the Related Art

A conventional high-performance programmable controller of this type is required to perform various operations such as logical operations in units of words, arithmetic operations, four basic and trigonometric operations using a floating point, square root operations, exponent operations, and logarithmic (LOG) operations in addition to bit operations. As a result, a designer has a difficult objective to satisfy the above needs with economical and dimensional limitations. Various implementations have been proposed from these points of view.

A typical conventional programmable controller will be described with reference to FIG. 1. In this controller, a bus line 1 is connected to a bit processor 2 for bit operations, which includes gate arrays for performing high-speed bit operations such as ladder chart processing having a large number of processing steps, a microprocessor 3 for executing operations in units of words, which cannot be performed by the bit processor 2, a coprocessor 4 for executing floating-point processing, a code memory 5 for storing each instruction code data, an instruction processing program memory 6 for storing the processing routine of each instruction, a data memory 7 for storing processing data and processed data, a process input/output circuit (PIO) 8, and the like. An output from the bit processor 2 is input to the microprocessor 3 through a signal line 9.

In the controller having the arrangement described above, when the bit processor 2 sequentially reads out instructions from the code memory 5, the bit processor 2 reads out the processing routine for each instruction from the instruction processing program memory 6 to execute a bit operation. In this bit operation in units of words, the bit processor 2 reads out bit data from the data memory 7 and the process input/output circuit (PIO) 8 to perform the bit operation. At the same time, the processed data is written in the data memory 7 and the process input/output circuit (PIO) 8.

When the bit processor 2 reads out an operation instruction to be performed in units of words but not to be performed by the bit processor 2 from the code memory 5, the bit processor 2 outputs an interrupt signal through the signal line 9 to inform the operation disable state to the microprocessor 3. When the microprocessor 3 receives this interrupt signal, the microprocessor 3 issues an INTA signal twice, which operation is the standard procedure of an Intel microprocessor, thereby recognizing the content of the interrupt signal. Thereafter, the microprocessor 3 reads out the instruction from the bit processor 2 and decodes the instruction on the basis of the recognized content of the interrupt signal. The microprocessor 3 reads out the processing routine corresponding to the decoded instruction from the instruction processing program memory 6, and fetches the data from the data memory 7 and the process input/output circuit (PIO) 8, thereby performing processing in units of words. When the operation in units of words is completed in the microprocessor 3, the microprocessor 3 informs the end of processing to the bit processor 2. The bit processor 2 then executes the next bit operation.

When the microprocessor 3 determines that an instruction involves floating-point processing which is inefficient processing for the microprocessor 3, the microprocessor 3 informs it to the floating-point operation coprocessor 4. The floating-point operation function is then shifted to the coprocessor 4. At this time, the microprocessor 3 transfers its control to the coprocessor 4 after the microprocessor 3 prepares data to be processed by the coprocessor 4. At the same time, the microprocessor 3 also transfers the content of processed data to the coprocessor 4.

The coprocessor 4 reads out the processing routine for the instruction processing program memory 6 and executes the floating-point operation and sends the processing result to the microprocessor 3. After the microprocessor 3 receives the processed data from the coprocessor 4, the microprocessor 3 outputs this processed data to the data memory 7 and the process input/output circuit (PIO) 8. The microprocessor 3 informs the end of operation for the floating-point instruction to the bit processor 2. The bit processor 2 reads out the next instruction and executes the operation in the same procedures as described above.

Although the above programmable controller can be realized at a relatively low cost, the following problems are posed.

(1) Although high-speed processing can be performed by the bit processor 2 in a bit operation, the operation function must be shifted to the microprocessor 3 in word operations in units of words. As a result, much time is required for data communication and prescribed control processing. Therefore, high-speed processing cannot be achieved even if the microprocessor 3 is used.

(2) In particular, in a floating-point operation, the processing route must be shifted in an order of the bit processor 2, the microprocessor 3, and the coprocessor 4. Therefore, even if the high-speed coprocessor 4 is used, its performance cannot be sufficiently exhibited.

(3) Since the conventional programmable controller has the three processors 2, 3, and 4, a large space is required for data communication buffer ICs and interconnections, thereby limiting the processing speed.

(4) In general, of all the functions of the programmable controller, the double-length floating-point operation function of the coprocessor 4 and the virtual memory function of the microprocessor 3 are often unnecessary. Although these functions can be omitted to achieve operations at a higher speed, LSIs of this type are often general-purpose products and cannot sufficiently cope with the above requirement.

(5) The parity check function and the reexecution function upon occurrence of an error (reliability, availability, and serviceability) are insufficient because the microprocessor 3 does not have these functions.

(6) Since the microprocessor 3 executes each instruction while decoding it, i.e. interpreter method, the processing speed becomes low due to the specific arrangement of the programmable controller for the reason to be described as follows. In a programmable controller, a program is read out from a memory by a program loader and is set displayable, and the program can be modified even during operation. Therefore, unlike, for example, a computer, a program cannot be compiled to translate it into a compact machine language.

(7) New demand has recently arisen for most advanced processing such as an SFC (Sequential Function Chart) complying with the IEC (International Electrotechnical Commission) standards as the international standards of programmable controllers and a fuzzy function at high speed without increasing the cost. The microprocessor 3 cannot sufficiently cope with the above demand.

(8) In addition, the microprocessor 3 performs interrupt processing when an overflow occurs in the operation result, thus prolonging the processing time. In order to eliminate this drawback, the interrupt processing may be omitted. In this case, however, since an overflow in status data must always be checked, it takes much time.

The programmable controller has the above various problems. The importance of cost performance must be recognized while maintaining high performance. On the other hand, when a large number of ICs are used, problems are posed as to the cost, reliability, and mounting space, although the resultant arrangement may have high performance. A combination of a commercially available LSI and a gate array is a popular technique in view of cost performance.

Since recent technical advances set out a silicon compiler or a standard cell technique capable of relatively easily designing a customized LSI within a short period of time and easily manufacturing a gate array, technical environments associated with such a technique are subject to spontaneous changes. That is, a high integration density of the gate array, which cannot be conventionally achieved, can be easily realized. In this case, however, only a limited number of circuits are mounted on one chip. It is very difficult to mount the three processors 2, 3, and 4 shown in FIG. 1 on one chip without any modifications in view of integration density. Although a specific circuit arrangement to be mounted on one chip and realization of high performance are current issues, no practical application is yet found.

SUMMARY OF THE INVENTION

It is an object of the present invention to provide programmable controllers having the following functions:

(1) a programmable controller in which an instruction system is systematized to simplify the hardware arrangement and achieve high-speed operations;

(2) a programmable controller in which a plurality of main circuits are realized on a single chip, and word operations and floating-point operations can be executed at high speed as in bit operations;

(3) a programmable controller which employs an SFC complying with the IEC standards as the international programmable controller standards to achieve most advanced operations at high speed and low cost;

(4) a programmable controller which realizes an RAS function for assuring reexecution during a parity check required as the controller and upon occurrence of a memory error; and (5) a programmable controller capable of performing interface processing with a program loader within a short period of time.

In order to achieve the above object, in a programmable controller according to the first aspect of the present invention, an instruction word of each operation instruction for executing an operation is defined as one word having the same bit length. Of all operation instructions, a bit operation instruction is constituted by one word consisting of an operation code and a bit address, and various operation instructions to be executed in units of words are classified into data load instructions, store instructions, and normal operation instructions. In the data load instruction and the store instruction, various addressing operations including memory access and immediate value addressing can be performed. In the normal operation instruction, operations between incorporated stacks are performed. In addition, in the normal operation instruction, an operation repetition count can be designated.

According to the first aspect of the present invention, all the operation instructions have the fixed length consisting of a predetermined number of bits. Various operation instructions to be executed in units of words, except for bit operation instructions which can be operated at high speed, are classified into data load instructions, store instructions, and normal operation instructions. In only the load and store instructions, memory access is allowed. In other normal operation instructions, operations between incorporated stacks are performed, thereby simplifying the instruction system and the logic and hence reducing the hardware size and performing high-speed operations. In addition, since the operation repetition count can be designated, the same operation can be repeated a plurality of number of times, thereby reducing the instruction steps.

A programmable controller according to the second aspect of the present invention comprises a microprogram memory for holding a microinstruction, a code memory for holding each operation instruction for executing an operation such that an instruction word serves as one word having the same bit length, a data memory for holding processing data, and an integrated central processing unit for executing the operation of the processing data held in the data memory by using the microinstruction stored in the microprogram memory and each operation instruction stored in the code memory. The microprogram memory for storing the microinstruction is also included in the integrated central processing unit, as needed.

In addition, the central processing unit includes a sequencer for designating an address of the microprogram memory and reading out a microinstruction at the designated address, a decoder for decoding the microinstruction read out by the sequencer and supplying an operation command to each constituent circuit, a program counter circuit having registers for holding a next address, a current address and a previous address of the code memory, an instruction register circuit having registers for holding an instruction from the code memory and an abnormal state, a data memory control circuit for read/write-accessing the processing data in the data memory on the basis of the instruction read out from the instruction register circuit, an address matching circuit for determining address states of the code memory and the data memory, a control register circuit for receiving an interrupt or an abnormality from the code memory or the data memory and sending the state of the code memory or the data memory to the sequencer and any other necessary constituent circuit, a bit operation circuit for executing a bit operation on the basis of the instruction from the code memory and holding the operation result, and a register circuit for holding intermediate data during the word operation and any other intermediate data. In addition, the central processing unit includes a fixed-point operation circuit and a floating-point operation circuit for performing fixed-point operations and logic operations by using a common multiplier circuit on the basis of the instruction from the code memory.

According to the second aspect of the present invention, the central processing unit for executing each operation instruction by using the microinstruction from the microprogram memory and each operation instruction from the code memory is integrated, and the microprogram memory for holding the microinstruction is also included in the central processing unit as one chip, as needed. Data communication time and the processing control time can be shortened, and high-speed operations can be performed.

A programmable controller according to the third aspect of the present invention comprises a control register circuit having means for causing the program counter circuit to execute read access of the code memory again within a predetermined operation repetition count upon reception of the interrupt or the abnormality from the code memory or the data memory, and means for causing the sequencer to inhibit storage data updating of the registers of the constituent circuits upon reception of the interrupt or the abnormality from the data memory, wherein the register circuit has a plurality of word operation stacks and general registers, which are switched upon switching between task levels.

According to the third aspect of the present invention, the code memory can be read-accessed again by the program counter circuit within the predetermined operation repetition count upon reception of the interrupt or the abnormality from the code memory. When a transient error occurs, the read access is repeated to assure the RAS function. The signal for inhibiting storage data updating of the registers of the respective constituent circuits is sent to the sequences upon reception of the interrupt or abnormality from the data memory. Therefore, an operation is not performed using erroneous data.

In addition, according to the third aspect of the present invention, the word operation stacks and the generation registers in the register circuits are switched upon switching between the task levels. Therefore, the task switching time can be shortened, and the response speed can be increased.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 is a view showing formats of various operation instructions used in a programmable controller according to the present invention;

FIG. 3 is a block diagram showing the hardware arrangement of a programmable controller according to an embodiment the present invention;

FIG. 6 is a view showing a program of the data flow format shown in FIG. 5;

FIG. 8 is a view showing an IF THEN ELSE program in FIG. 7;

FIG. 9 is similarly a view showing the IF THEN ELSE program in FIG. 7;

FIG. 13 is a block diagram showing the detailed arrangement of still another part of the controller shown in FIG. 3;

FIG. 14 is a timing chart showing part of the program shown in FIG. 4B; and

FIG. 15 is a timing chart showing part of the program shown in FIGS. 5 and 6.

DETAILED DESCRIPTION OF THE PREFERRED EMBODIMENTS

Figure 1:
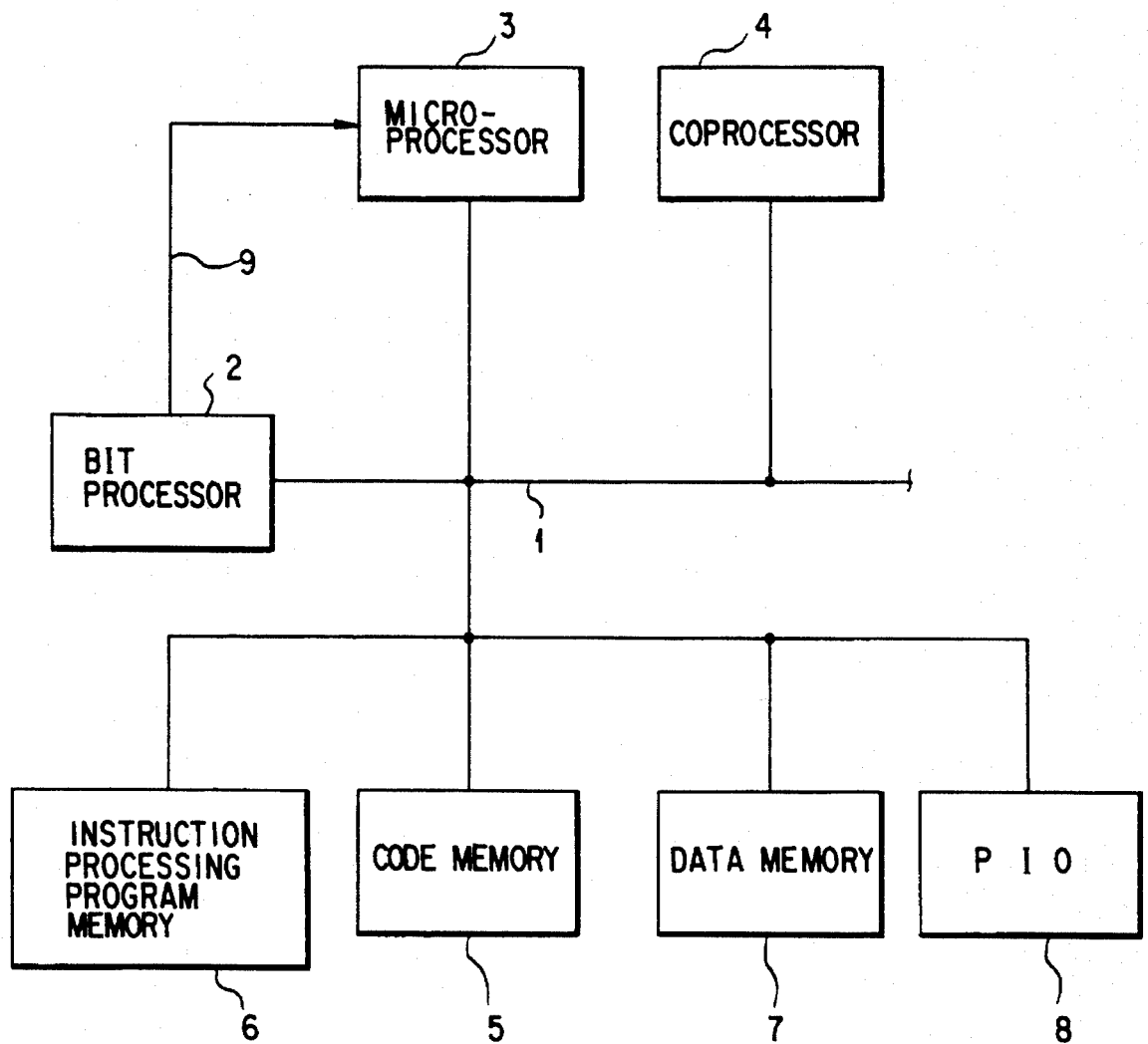
FIG. 1 is a block diagram showing the hardware arrangement of a conventional programmable controller.

A preferred embodiment of the present invention will be described in detail with reference to the accompanying drawings.

FIG. 2 is a view showing formats of instruction words as characteristic features of a programmable controller according to the present invention. The formats of the instruction words shown in FIG. 2 constitute an instruction system for mounting an operation system on one chip. Each instruction in the programmable controller according to the present invention has a fixed length of, e.g., 32 bits. All the instructions are classified into six types of instructions.

An instruction word as a type 1 is a bit operation instruction word for performing logic operations in units of bits at high speed. This instruction word consists of an operation code OP and a bit address BA, and details of this instruction word will be described later.

An instruction word as a type 2 is an instruction word representing a prefix instruction used for index modification of a bit operation instruction. The instruction as the type 2 consists of an operation code OP and an index modifier X.

An instruction word as a type 3 is an instruction word representing a word operation instruction for performing operations in units of words. This instruction consists of an operation code OP, an index modifier X, and a word address WA. The reason why the index modifier X is added in the type 3 lies in that the bit address BA for designating a bit position in a word requires a larger number of bits to designate the same memory space than that of the word address WA, so that the index modifier X is used to designate the memory space by a smaller number of bits. In particular, this word operation instruction requires a long period of time to process a plurality of bits. In view of this, a load instruction and a store instruction are allowed to access the memory, and other instructions cannot look up the memory, thereby simplifying the instruction arrangements to reduce the decoding time. Therefore, the cycle time can be shortened by performing operations between only internal registers.

Instruction words as types 4 and 5 are instruction words for loading a fixed value K. The instruction word as the type 4 has an 8-bit operation code OP and 16-bit fixed value data. The instruction word as the type 5 has a 4-bit operation code OP and 28-bit fixed value data. According to the instruction word as the type 5, a fixed value having lower 4 bits of "0" of 32 bits of a single-precision floating point fraction complying with the IEEE standards as the international interface standards can be loaded.

An instruction word as a type 6 is an instruction word used for all operation instructions such as word and floating-point instructions which require neither addresses nor fixed values. The instruction as the type 6 consists of a condition area constituted by an upper 3 bits, a 9-bit operation code OP, and a 4-bit operation repetition count designation area M. Each operation instruction has a large number of operation codes. In types except for the types 1 to 5, eight bits consisting of the 31st bit to the 24th bit are not sufficient, so that the upper 3-bit condition area is set to be "111", and the 9-bit operation code OP is set to follow the "111". Therefore, 736 (=256×⅞+512) operation codes can be designated.

In another method, an instruction word is set variable. In this case, the overall size of the code can be reduced. The instruction word as the type 6 can be reduced to a 16-bit length. However, when the instruction word is set variable, control is complicated. When an arbitrary address of the code memory is monitored in program loading, disassembling cannot be performed because the boundary between the instructions cannot be specified and decoded since the instructions are variable.

FIG. 3 is a block diagram showing the hardware arrangement of the programmable controller according to the present invention. In the programmable controller according to the present invention, a central processing unit A constituted by a one-chip LSI is connected to a micro-ROM for holding microinstructions, a code memory CM for holding each operation instruction, a data memory DM for holding processing data and processed data, and a process input/output circuit PIO.

The code memory CM and the data memory DM are arranged complying with, e.g., a 32-bit microprocessor 180386 available from Intel Corp., U.S.A.. Each of the code memory CM and the data memory DM has ADS#, READY#, BS16#, W/R#, D/C, M/IO#, HOLD, and HLDA as bus control signals. The addresses and the bus are arranged complying with the microprocessor 180386 because the peripheral LSIs and the memory chips can then be easily interfaced.

The central processing unit A comprises a sequencer 10 for supplying an address signal S11 to the micro-ROM to extract a microinstruction S12, a decoder 20 for receiving a microinstruction S13 to be executed from the sequencer 10, decoding the microinstruction S13, and outputting an operation command S21 to the constituent circuits, a program counter circuit 30 having a plurality of registers (counters) for supplying a next code address signal S31 to the code memory CM and for storing the next program address, the current program address, and the previous program address, and an instruction register circuit 40, having a plurality of registers respectively corresponding to the plurality of registers of the program counter circuit 30, for storing a code read out from the code memory CM, i.e., a program controller instruction, and an abnormal signal S41 such as a parity error. The detailed arrangements of the sequencer 10, the decoder 20, the program counter circuit 30, and the instruction register circuit 40 will be described later.

The central processing unit A also comprises: a data memory control circuit 50 for holding a register for supplying an address signal S51 to the data memory DM and a register for holding read/write data for reading out data from or writing it in the data memory DM, detecting an abnormal state such as a parity error and a check, and controlling the access of the data memory DM; and an address matching circuit 60 for detecting address matching in the code memory CM or the data memory DM in units of words or bits and instruction execution between two addresses of the code memory CM. The detailed arrangements of the data memory control circuit 50 and the address matching circuit 60 will be described later.

The central processing unit A further comprises: a control register circuit 70 for storing an interrupt signal S71 and an abnormal state from other constituent circuits, sending out predetermined signals to the sequencer 10 upon detection of the interrupt signal S71 or the abnormal state, storing a program status word and sending out its partial signal S72 to the outside, and holding various modes of the repetition control counter and the programmable controller; and a bit operation circuit 80 for executing bit operations and causing two stacks, a bit register, and an SFC register to hold the operation results. The detailed arrangements of the control register circuit 70 and the bit operation circuit 80 will be described later.

In addition, the central processing unit A comprises a register circuit 90 having general registers and two word operation stacks, a fixed-point operation circuit A0 for executing a fixed-point operation, a logical operation, and a shift operation, a floating-point operation circuit B0 for executing a floating-point operation, and a multiplier circuit C0 having a multiplier. The detailed arrangement of the register circuit 90, the fixed-point operation circuit A0, the floating-point operation circuit B0, and the multiplier circuit C0 will be described later.

The respective circuits in the central processing unit A are connected to a data bus B constituted by a plurality of buses for exchanging data with the respective constituent circuits.

The operation of the programmable controller having the above arrangement will be described below.

When a power switch is turned on, the sequencer 10 initializes the respective constituent circuits in the central processing unit A. That is, the sequencer 10 designates address 0 of the micro-ROM, reads out the microinstruction S12 required for initialization from address 0, and sends the microinstruction S12 to the decoder 20. At this time, the sequencer 10 simultaneously sends the current microinstruction and the next microinstruction, i.e., two microinstructions S13, to the decoder 20. The decoder 20 supplies an initialization operation command S21 to the respective constituent circuits and the memory elements of each memory to perform initialization.

At this time, the program counter circuit 30 represents address 0 and designates address 0 of the code memory CM. The program counter circuit 30 sequentially reads out the instructions from address 0 and sends the readout instructions to the instruction register circuit 40. The instruction register circuit 40 comprises a plurality of registers to constitute a queue and sequentially holds the instructions read out from the code memory CM. The program counter circuit 30 sequentially stores addresses of the instructions read out in correspondence with the instruction read access of the instruction register circuit 40.

The instructions stored in the instruction register circuit 40 are supplied to the sequencer 10. The sequencer 10 reads out the content of the micro-ROM having the operation code OP as an address. The readout microinstruction is sent to the decoder 20. The decoder 20 decodes the microinstruction to send the operation command S21 to the respective constituent circuits, thereby executing each instruction.

For example, if the instruction is a bit operation instruction, the bit address BA of the type 1 is supplied to the data memory control circuit 50 in accordance with the operation command S21 from the decoder 20. The data memory control circuit 50 reads out data from the data memory DM to extract designated bits corresponding to the bit address BA and to send the designated bits to the bit operation circuit 80. The bit operation circuit 80 performs a bit operation. The address matching circuit 60 always checks if the designated address is accessed. If so, the address matching circuit 60 supplies an interrupt signal to the control register circuit 70.

If the instruction is a word operation instruction which is only a memory load instruction or a store instruction, data is exchanged between the data memory control circuit 50 and the stacks of the register circuit 90. That is, data are stored in the stacks for the load instruction, or the data are unloaded from the stacks for the store instruction. The data in the stacks are used for operation in the fixed-point operation circuit A0 or the floating-point operation circuit B0. In addition, both multiplications in the fixed-point and floating-point operations are performed using the multiplier circuit C0.

Detailed processing methods of various instructions will be described below.

(1) Bit Operation

Figures 4A, 4B:
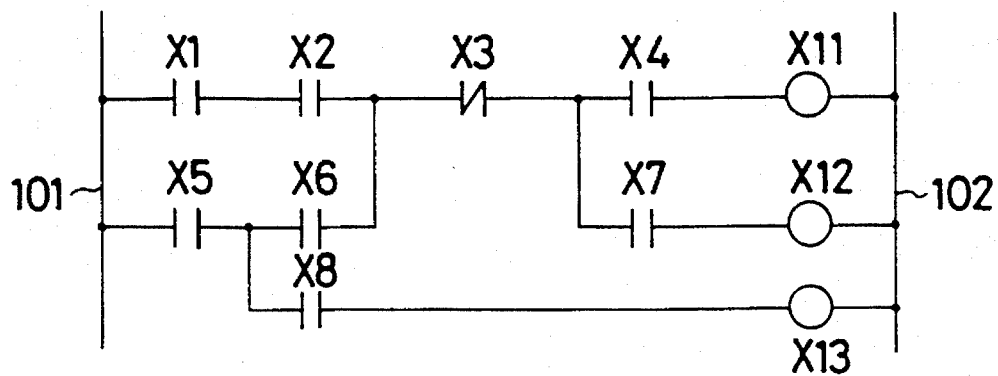
FIGS. 4A and 4B are views showing a program for performing a bit operation according to the present invention so as to explain the graphic expressions, and the contents and operations of the instructions of the program.

FIGS. 4A and 4B are views for explaining a bit operation. As is apparent from FIGS. 4A and 4B, a program is created in a program loader in accordance with a ladder chart, and is set displayable. The respective elements in this ladder chart have graphic patterns, instruction words, and operation (program) contents in correspondence with the addresses, respectively. Instruction words B9 and B1 are used in the forms corresponding to the types of graphic patterns.

Referring to FIG. 4A, reference numeral 101 denotes a left bus in the ladder chart. Reference symbols X1 to X8 denote contacts; and X11 to X13, coils. These represent bit addresses. Reference symbol MCFF in FIG. 4B denotes a bit state of the left bus 101 in the ladder chart; LS, a stack for holding a left-side state of each contact; and RS, a stack for holding a right-side state of each contact. Reference symbol BR denote a bit register for holding a bit operation result. In addition, ↓ represents a push for storing data in the stack, and ↑ represents a pop for unloading data from the stack.

The operation contents will be described in an order of code addresses.

Address 0: The state of the left bus 101 of the first contact X1 is pushed in the stack LS, and at the same time, the logical AND result of the left bus 101 and the contact X2 is held in the bit register BR.

Address 1: Since the two contacts X1 and X2 are connected in series with each other, the logical AND result of the content of the bit register BR and the contact X2 is held in the bit register BR.

Address 2: Since the right side of the contact X2 is branched into two directions, the content of the bit register BR is pushed in the stack RS. At this time, since the left-side state of the contact X1 is stored in the stack LS, the content of the stack LS is logically ANDed with the contact X5, and the result is held in the bit register BR. At the same time, the stack LS is popped.

Address 3: Since the left side of the contact X6 is branched, the content of the bit register BR is pushed in the stack LS. The content of the bit register BR is logically ANDed with the contact X6, the left-side state of the contact X2 is unloaded from the stack RS, and this unloaded content is logically ORed with the above logical AND result. The result is stored in the bit register BR, and at the same time, the stack RS is popped.

Address 4: Since the contact X3 is the B contact, the bit register BR is logically ANDed with the logical NOT value of the contact X3, and the result is stored in the bit register BR.

Address 5: Since the left side of the contact X4 is branched, the content of the bit register BR is pushed in the stack LS. The content of the bit register BR is logically ANDed with the-contact X4, and the result is stored in the bit register BR.

Address 6: Since the instruction is an instruction for storing the content of the bit register BR in the coil X11, the content of the bit register BR is written in the coil X11. Since read/write access of the data memory DM is performed every plurality of bits, one-bit write access cannot be performed. For this reason, other bits are also written in the data memory DM. In order to set these other bits unchangeable, the same address is read-accessed, and only the designated bit in a new state is written again.

Address 7: The left-side state of the contact X4 is read out from the stack LS and is logically ANDed with the contact X7, and the result is stored in the bit register BR.

Address 8: The content of the bit register BR is written in the coil X12 in the same manner as at address 6.

Address 9: The left-side state of the contact X6 which is stored in the stack LS is extracted and logically ANDed with the contact XS, and the result is stored in the bit register BR.

Address 10: The content of the bit register BR is written in the coil X13 in the same manner as at address 6.

(2) Word Operation

Figure 5:
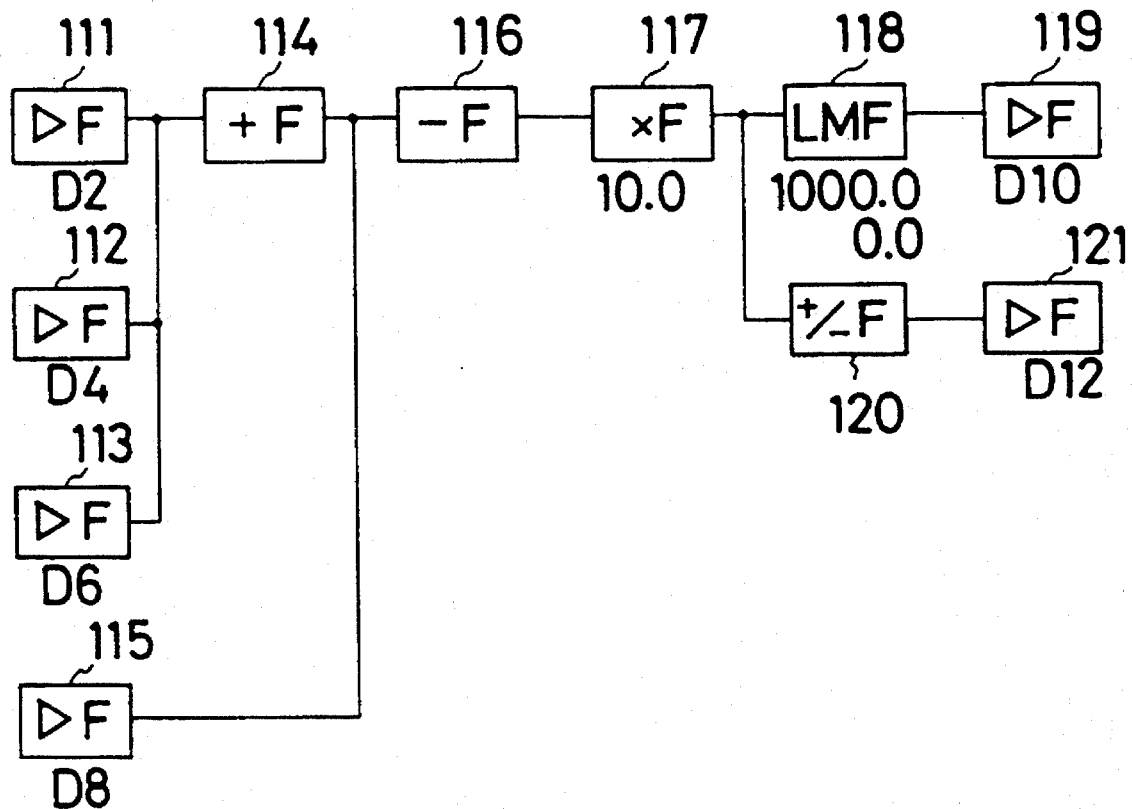
FIG. 5 is a view showing a data flow format for performing a numerical operation according to the present invention.

The word operation is expressed in the data flow format in which data flows from the left to the right, as shown in FIGS. 5 and 6. Rectangular blocks in FIGS. 5 and 6 are function blocks. Of these function blocks, function blocks 111 to 113 and 115 are function blocks for loading a word. In this case, a load operation of a floating point is shown. D2, D4, . . . represent word addresses. D represents a double length (32 bits). Function blocks 119 and 121 represent a store operation of the word. In this case, a store operation of a floating point is shown. D10 and D12 represent word addresses.

A function block 114 represents a floating-point addition, a function block 116 represents a floating-point subtraction, a function block 117 represents a floating-point multiplication, a value, 10.0, under the function block 117 represents a fixed multiplier, 10.0. If an operand is not a fixed value, it is input from the left as indicated by the load instruction in the function block 115. The product as the result from the function block 117 is supplied to function blocks 118 and 120. The function block 118 limits the operation result by an upper limiter of 1,000.0 and a lower limiter of 0.0. The function block 119 stores the data at address D10. The function block 120 inverts the sign of the operation result and supplies the inverted result to the function block 121. The function block 121 stores the output from the function block 120 at address D12.

The contents of the operations (program) will be described in an order of code addresses in FIG. 6.

Address 20: Data at address D2 of the data memory DM is read out and pushed in a word right stack WRS. This stack WRS is arranged in the register circuit 90 (to be described in detail later). The register circuit 90 has another word left stack WLS. This word left stack WLS is used to save data up on branch of the data flow.

Address 21: Data at address D4 of the data memory DM is read out and pushed in the word right stack WRS.

Address 22: The content at address D6 is read out and pushed in the word right stack WRS. The data from the stack top are stored in the word right stack WRS in an order of addresses D6, D4, and D2 in accordance with the operations at addresses 20 to 22.

Address 23: Since "1" is set in the operation repetition count M of the instruction word as the type 6, a total count M=2. The four operations are performed by the stack top and the registers below the stack top. The operation result is stored below the stack top, and the stack is popped. That is, data at addresses D4 and D6 are operated, and the operation result is located at address D4. The result indicates the stack top. This state is represented by the logical formula in FIG. 6 as follows:

(WRS−1)+(WRS)→(WRS−1)

WRS↓

Almost the same operation as described above is performed for the second time. That is, the result of the first time and the data at address D2 are operated, and all the operation results are stored at address D2. The operations are repeated in accordance with the content of the counter. Every time an operation is performed, the count of the counter is decremented. When the count reaches zero, the series of operations are ended.

Address 24: The content at address D8 is read out and pushed in the word right stack WRS.

Address 25: Data at address D8 is subtracted from the above sum, and the difference is stored in the word right stack WRS. The stack WRS is popped once. The result is stored in the stack top. The subtraction repetition count is not designated.

Address 26: A multiplier of 10.0 is pushed in the stack WRS.

Address 27: The current operation result is multiplied with the multiplier of 10.0, and the product is stored in the stack WRS. Since the stack WRS is popped in the same manner as described above, the result is stored in the stack top. Since the repetition count is designated as zero, the above multiplication is performed only once.

Address 28: Since the connecting line is branched downward, the operation result is pushed and stored in the stack WLS.

Address 29: The upper limit of 1,000.0 is pushed in the stack WRS.

Address 30: The lower limit of 0.0 is pushed in the stack WRS. That is, the limits of 0.0 and 1,000.0 are sequentially stored from the stack top on the basis of addresses 29 and 30.

Address 31: The current operation result is limited by the contents stored in the stack WRS. Since the stack WRS is popped twice, the limited operation result is stored in the stack top. Whether the limited operation result falls within the range of the upper and lower limits is determined by a subtraction.

Address 32: The operation result in the stack WRS is stored at address D10, and the stack WRS is popped.

Address 33: The information stored in the stack WLS is popped and pushed in the stack WRS.

Address 34: The sign of the content of the stack top of the stack WRS is inverted, and the inverted content is stored in the stack WRS again.

Address 35: The content of the stack top of the stack WRS is stored at address D12, and the stack WRS is popped.

(3) IF THEN ELSE Operation

Figures 7A, 7B:
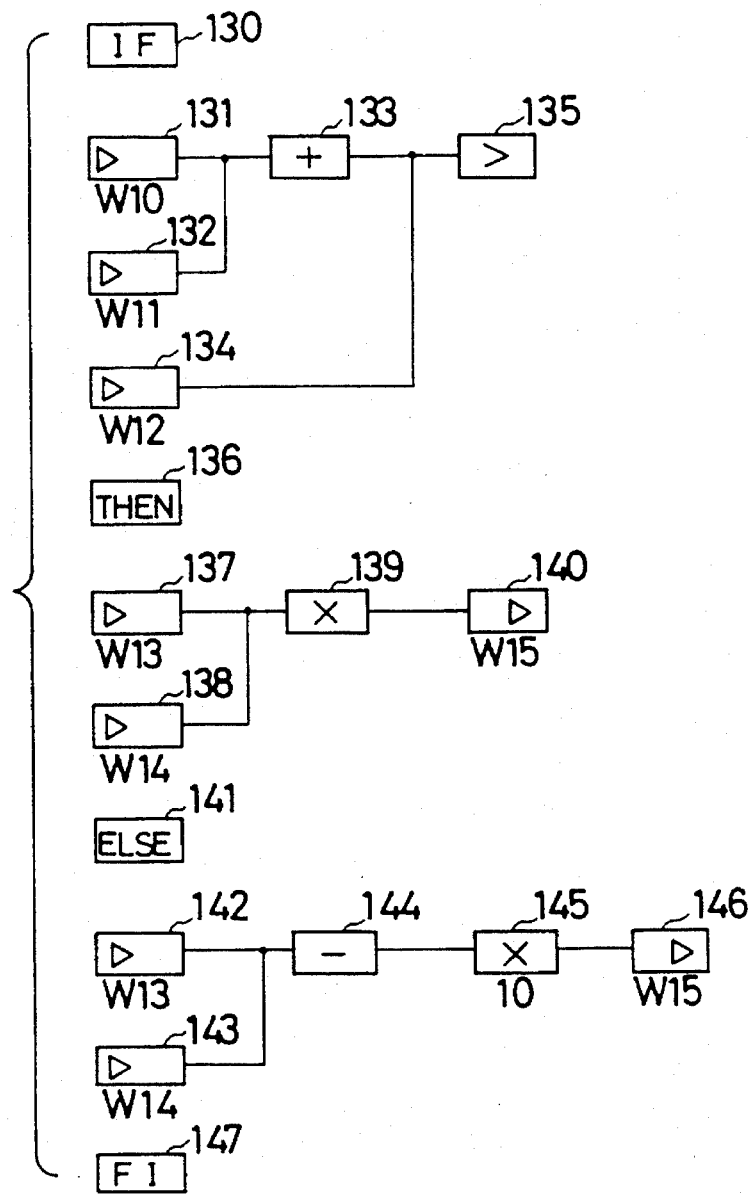
FIGS. 7A and 7B are views showing a data flow format and a text format so as to perform an IF THEN ELSE operation.

This operation is shown in FIGS. 7A to 9. FIG. 7A shows this operation in the data flow format, and FIG. 7B shows this operation in the text format.

The data flow format in FIG. 7A can be programmed, as shown in FIGS. 8 and 9. A function block 130 in FIG. 7A represents the start of an IF statement. A function block 136 represents THEN, a function block 141 represents ELSE, and a function block 147 represents FI which is the end of the IF statement. A function block 135 compares two inputs. When data on the upper side of the data flow is larger than data (W12) on the lower side, the bit register BR is set at "1". Other function blocks are the same as those in FIG. 5, except for the absence of the F at the right end, i.e., it does not involve floating point processing.

The IF THEN ELSE operation will be described in accordance with the program shown in FIGS. 8 and 9 with reference to FIG. 7A.

Address 40: This address indicates the start of the IF statement, and no special processing is performed.

Address 41: A word (16 bits) W10 is read out and pushed in the word right stack WRS.

Address 42: The state of a word W11 is read out and pushed in the word right stack WRS.

Address 43: The words W11 and W12 pushed in the word right stack WRS are added, and the sum is stored in the word right stack WRS.

Address 44: The content of the word W12 is read out and pushed in the word right stack WRS.

Address 45: It is determined whether the data below the stack top of the word right stack WRS is larger than that of the stack top. If so, the bit register BR is set at "1". Otherwise, the bit register BR is set at "0". This value of the bit register BR serves as a condition determination reference.

Address 46: The NOT signal of the content of the bit register BR is stored in a flip-flop SIFF. The flip-flop SIFF is one of the flip-flops in the bit operation circuit 80 and serves as a constituent element of a flag register A8 like the bit register BR and a flip-flop MSFF. The flip-flop SIFF stores a branch condition and is used to perform a branch operation such as jump determination at ELSE and determination upon IF and DO statement inputs. If the bit register BR is set at "0", the flow jumps to ELSE at address 51.

Address 47: The contents from address 47 to address 50 are executed by THEN. The state of a word W13 is read out and pushed in the word right stack WRS.

Address 48: The state of a word W14 is read out and pushed in the word right stack WRS.

Address 49: The value of the stack top of the word right stack WRS is multiplied with a value below the stack top, and the product is stored below the stack top. The word right stack WRS is popped once. By this operation, the product is stored in the stack top.

Address 50: The content of the stack top of the word right stack WRS is written in a word W15, and then the word right stack WRS is popped once.

Address 51: If the flip-flop SIFF is set at "0", it is caused to go to "1", and the flow jumps to FI at address 58. However, if the flip-flop SIFF is set at "1", it is caused to go to "0", and an instruction from address 52, executed by ELSE is executed. When the flow advances from address 50 to this address, the flip-flop SIFF is set at "0". However, when the flow advances from address 46 to this address, the flip-flop SIFF is set at "1".

Address 52: The state of the word W13 is read out and pushed in the word right stack WRS.

Address 53: The state of the word W14 is read out and pushed in the word right stack WRS.

Address 54: The value of the stack top is subtracted from the value below the stack top of the word right stack WRS, and the difference is stored below the stack top. The word right stack WRS is popped.

Address 55: A multiplier of 10 is pushed in the word right stack WRS.

Address 56: A multiplication is performed as at address 49.

Address 57: The word right stack WRS is popped, and the product is stored in the word right stack WRS.

Address 58: The flip-flop SIFF is reset to "0".

The detailed arrangements of the respective constituent circuits of the central processing unit A shown in FIG. 3 will be described with reference to FIGS. 10 to 13.

Figure 10:
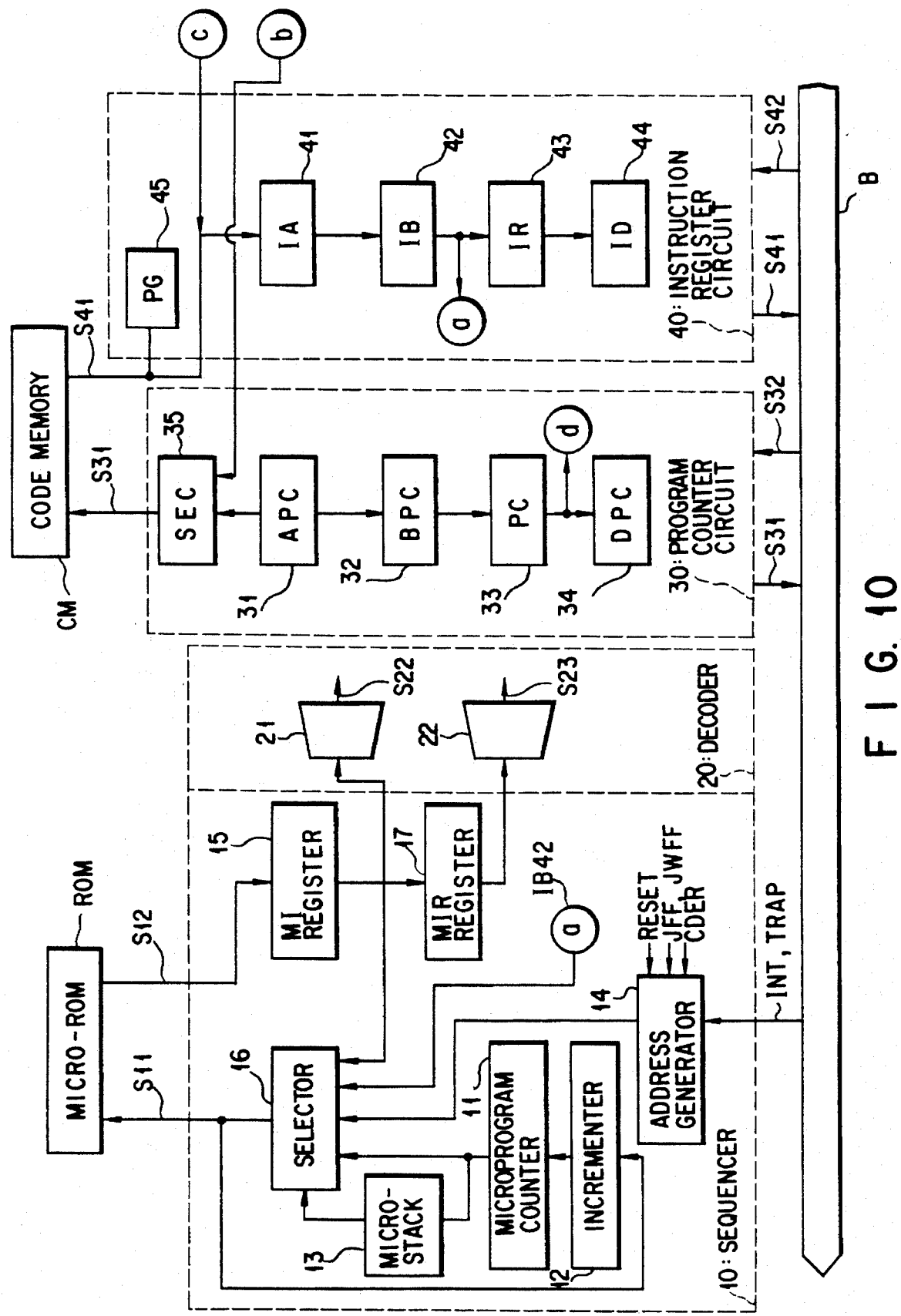
FIG. 10 is a block diagram showing the detailed arrangement of part of the controller shown in FIG. 3.

(1) Sequencer 10 (FIG. 10)

The sequencer 10 has a function of addressing the micro-ROM and reading out a microprogram instruction from the micro-ROM and holding the readout microprogram instruction, and a function of supplying this microprogram instruction to the decoder 20.

The sequencer 10 comprises a microprogram counter 11 for holding an address signal for addressing the micro-ROM, an incrementer 12 for incrementing the address of the microprogram counter 11 by one at a time, a microstack 13 for storing a return address in a microprogram subroutine or repetition processing, and an address generator 14 for generating a fixed address for the microprogram.

The address generator 14 has predetermined fixed addresses corresponding to an initialization signal RESET, an interrupt generation signal INT, a trap generation signal TRAP, a bit jump signal JFF, a word jump signal JWFF, and a code error signal CDER, all of which are externally input. Upon reception of any one of the above signals, the address generator 14 generates the corresponding fixed address. Such a fixed address is defined as follows:

Address 2 . . . Initialization signal RESET
Address 4 . . . Trap generation signal TRAP
Address 5 . . . Interrupt generation signal INT
Address 6 . . . Code error signal CDER
Address 12 . . . Bit jump signal JFF and word jump signal JWFF The sequencer 10 receives each operation code OP from an IB register 42 of the instruction register circuit 40.

Each of the instruction words as types 1 to 4 shown in FIG. 2 has an 8-bit operation code OP from bit 31 to bit 24. An address consists of this 8-bit operation code OP and two bits following it. That is, the address is four times the operation code OP. These types are allocated to the address area from address 1024 to address 2047 of the micro-ROM. The upper bits of the address are given as "000001" (binary notation). The micro-ROM has a 16-bit address.

If an index modifier is present, an address to be accessed must be calculated. For this reason, the first bit of the two bits following the operation code OP is used to determine the presence/absence of the index modifier. Therefore, in practice, 9-bit units, i.e., 512 instructions, can be processed. However, only the 7/8 portion of the total capacity is used in practice.

Each instruction as the type 5 has a 4-bit operation code OP from bit 31 to bit 28, and an address consists of the operation code OP and two bits following it. The address for the instruction word as the type 5 is the same as those of the instruction words as the types 1 to 4.

The position of the operation code OP of the instruction word as the type 6 is shifted from those of other instruction words because the type 6 accompanies memory access. However, in this case, an address is four times the operation code OP as in other instruction words. The type 6 is allocated to the address area of addresses from address 2048 to address 4095 of the micro-ROM. The upper bits of the address are given as "00001" (binary notation), and the memory space can store 512 instructions. The address space is assured for one instruction per four addresses.

In the address jump mode of the micro-ROM, the sequencer 10 receives a microinstruction from an MI register 15 and determines the address of the micro-ROM by 16-bit data which represents a jump destination address.

The sequencer 10 includes the MI register 15 and an MIR register 17 in addition to a selector 16.

The selector 16 selects one of the five addresses and supplies the selected address to the micro-ROM. The five addresses are defined as follows:

output address of microprogram counter 11;

output address of the microstack 13;

output address of the address generator 14 for generating a fixed address;

output address of the instruction register circuit (IB register 42); and microinstruction from the MI register 15.

The selector 16 operates as follows.

a) When a special state such as initialization and an interrupt is set, the selector 16 selects the output address of the address generator 14.

b) When a normal controller instruction is to be executed, the selector 16 selects the output address of the IB register 42.

c) When microinstructions continue, the selector 16 selects the output address of the microprogram counter 11.

d) When an address jump is required, the selector 16 selects a microinstruction from the MI register 15 and addresses the micro-ROM.

By the above operation, e.g., a 32-bit microinstruction is output from the micro-ROM on the basis of the selected address and is stored in the MI register 15. In the next cycle, the microinstruction in the MI register 15 is shifted to the MIR register 17. That is, the next microinstruction is stored in the MI register 15, and the current microinstruction is stored in the MIR register 17.

(2) Decoder 20 (FIG. 10)

The decoder 20 comprises a current microinstruction decoder 21 and a next microinstruction decoder 22. The current microinstruction decoder 21 decodes the microinstruction next to the MI register 15. The next microinstruction decoder 22 decodes the current microinstruction. Control signals S22 and S23 each serving as the operation command S21 are output to the respective constituent circuits in accordance with the decoding contents of the current microinstruction decoder 21 and the next microinstruction decoder 22. The next microinstruction is decoded because instructions must be pre-read in 4-stage pipeline processing.

(3) Program Counter Circuit 30 (FIG. 10)

The program counter circuit 30 comprises a selector (SEL) 35 in addition to four program counter 31 to 34 for storing a code address. In these program counters 31 to 34, the code address is shifted in an order of 31→32→33→34 every time execution of one program is completed.

The program counter (APC) 31 has an incrementer function and increments the code address by one every time a read access is completed. The program counter (APC) 31 holds a pre-read code address. The counters 32 to 34 except for the program counter (APC) 31 do not have an incrementer function and hold addresses. The program counter (BPC) 32 holds the next address, the program counter (PC) 33 holds the current address, and the program counter (DPC) 34 holds the previous address.

When a jump operation is to be preformed by a programmable controller instruction such as a THEN instruction at address 46 in FIG. 8, the program counter circuit 30 writes the content of address 51 in the program counter (APC) 31. At the same time, the same content is written in the program counter (BPC) 32 because the content of the program counter (BPC) 32 is invalidated. Since the IB register 42 (to be described later) is also invalidated, the program counter circuit 30 also writes an invalid instruction in the IB register 42.

The selector (SEL) 35 selects access of the code memory CM on the basis of one of the code address in the program counter (APC) 31 and the address, in the code memory CM, which is supplied from a memory address register 51 in the data memory control circuit 50. The address in the program counter (APC) 31 is normally selected. However, when read/write access of the code memory CM is to be performed, the address in the memory address register 51 is selected. The code address selected by the selector (SEL) 35 is supplied to the code memory CM.

(4) Instruction Register Circuit 40 (FIG. 10)

The instruction register circuit 40 is a circuit for holding the instruction read out from the code memory CM addressed by the selector (SEL) 35 of the program counter circuit 30. More specifically, the instruction register circuit 40 comprises four instruction registers 41 to 44, respectively, corresponding to the program counters 31 to 34, and a parity bit check generator (PG) 45. This instruction register circuit 40 has a plurality of registers for pre-read and pipeline operations as in the program counter circuit 30.

Of the plurality of registers, the IA register 41 holds the pre-read instruction, the IB register 42 holds the next instruction, the IR register 43 holds the current instruction, and the ID register 44 holds the previous instruction held in the IR register 43.

The instruction read out from the code memory CM is input to the IA register 41. This instruction is shifted in an order of 41→42→43→44 every time one instruction is completed. When no instruction is supplied from the IA register 41 to the IB register 42 while the IB register 42 is empty, an invalid instruction is held in the IB register 42. The instruction register circuit 40 exchange data with the data bus B through the signal line S41 and a signal line S42.

The parity bit check generator (PG) 45 compares 32-bit data read out from the code memory CM with a readout parity bit. Note that the parity bit is generated every 16 bit of a total of 32 bits, so that two parity bits are generated. The presence/absence of a parity error bit, the 32-bit instruction, and other errors are stored in the IA register 41 and the IB register 42. With this operation, if an error is present, the error is not immediately used, but error processing is performed when the readout instruction is executed. The above other errors include a so-called "no answer" error representing that a ready signal for the code memory CM does not return within a predetermined period of time, a so-called range error representing that an area not corresponding to the code memory CM or an access inhibition area is accessed, and the like. These error signals are externally input.

When the instruction from the code memory CM is not fetched but accessed as data, the instruction is controlled by the data memory control circuit 50. In this case, all read and write access operations of write and read data are performed through the data memory control circuit 50.

Figure 11:
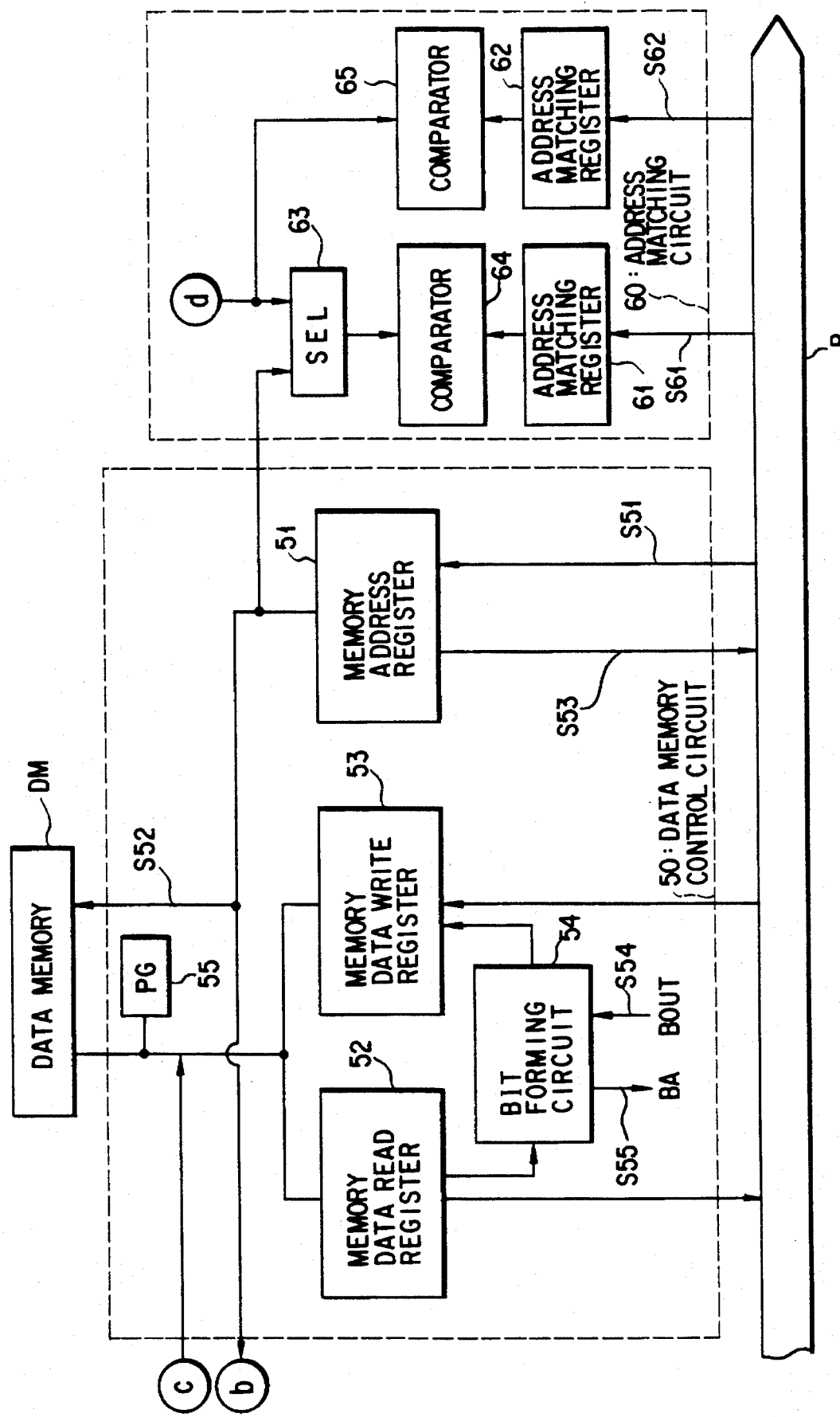
FIG. 11 is a block diagram showing the detailed arrangement of another part of the controller shown in FIG. 3.

(5) Data Memory Control Circuit 50 (FIG. 11)

The data memory control circuit 50 is a circuit for controlling access to the data memory DM. The data memory control circuit 50 comprises the memory address register 51, a memory data read register 52 for reading data from the data memory DM, a memory data write register 53 for writing the data in the data memory DM, a bit forming circuit 54, and a parity bit check generator (PG) 55.

The parity bit check generator (PG) 55 generates a parity bit every 16 bit of a total of 32 bits from the data memory DM in the same manner as in the parity bit check generator (PG) 45, writes the parity bits in the data memory DM in the write mode, and compares the readout parity bit with the generated parity bit to determine whether an error has occurred in the read mode. The parity bit check generator (PG) 55 detects error signals such as a "no answer" error signal and a range error signal in addition to the parity error as in the code memory CM. Each error signal parity bit is added to assure the RAS function. In a bit operation, since read and write operations are performed in units of bits, 32-bit access is not required, so 16-bit access is performed.

The memory address register 51 determines an address on the basis of a programmable controller instruction sent through the data bus B and a signal line S51. The memory address register 51 supplies an address signal S52 to the data memory DM. The data memory DM is accessed in units of 16 bits, i.e., units of words as the minimum units. The memory address register 51 recognizes 16-, 32-, or 1-bit access on the basis of the control signal from the decoder 20. The 6- and 32-bit access operations are performed by designating BE3# to BE0# complying with the 32-bit microprocessor 180386 available from Intel Corp., U.S.A. It is possible to perform 16-bit wide memory access using BS16#.

In 1-bit access, since a bit address is supplied to the memory address register 51, the address signal corresponding to the word portion is supplied to the data memory DM through a signal line S52. One of the bits in the word is accessible by supplying a 4-bit address signal to the bit forming circuit 54 through a signal line S54.

In the data read mode of the data memory DM, 16-bit data is supplied from the memory data read register 52 to the bit forming circuit 54. The bit forming circuit 54 selects one bit on the basis of the 4-bit address signal from the memory address register 51 and sends the selected one bit to the bit operation circuit 80 through a BA signal line S55.

In the data write mode of the data memory DM, a new bit state to be written, sent from the bit operation circuit 80 through the signal line S54, is supplied as a signal BOUT to the bit forming circuit 54. At the same time, the designated bit (from the memory address register 51) of a signal from the memory data read register 52 is replaced with the signal BOUT. The resultant data is supplied to the memory data write register 53. Therefore, this data is written as word data from the memory data write register 53 to the data memory DM.

The bit forming circuit 54 checks if write data is the same as readout data. Write data which has already been stored can be prevented from being written again in the memory, thereby preventing wasteful write access and shortening the write access.

(6) Address Matching Circuit 60 (FIG. 11)

The address matching circuit 60 comprises two address matching registers 61 and 62 in which designated addresses are written through the data bus B and signal lines S61 and S62, a selector (SEL) 63 for selecting a code address signal from the program counter (PC) 33 or the address signal from the memory address register 51, a comparator 64 for comparing an output from the selector (SEL) 63 with an output from the address matching register 61, and a comparator 65 for comparing the output from the program counter (PC) 33 with an output from the address matching register 62. Only the comparator 64 is used in a normal operation. The comparator 64 determines whether the actual address coincides with the designated address in the code fetch mode. If two designated addresses are required, the comparator 64 causes the comparator 65 to determine whether these two designated addresses fall within a predetermined range, thereby generating an address matching interrupt signal.

This interrupt signal S71 is supplied to the control register circuit 70 through a signal line S71.

Figure 12:
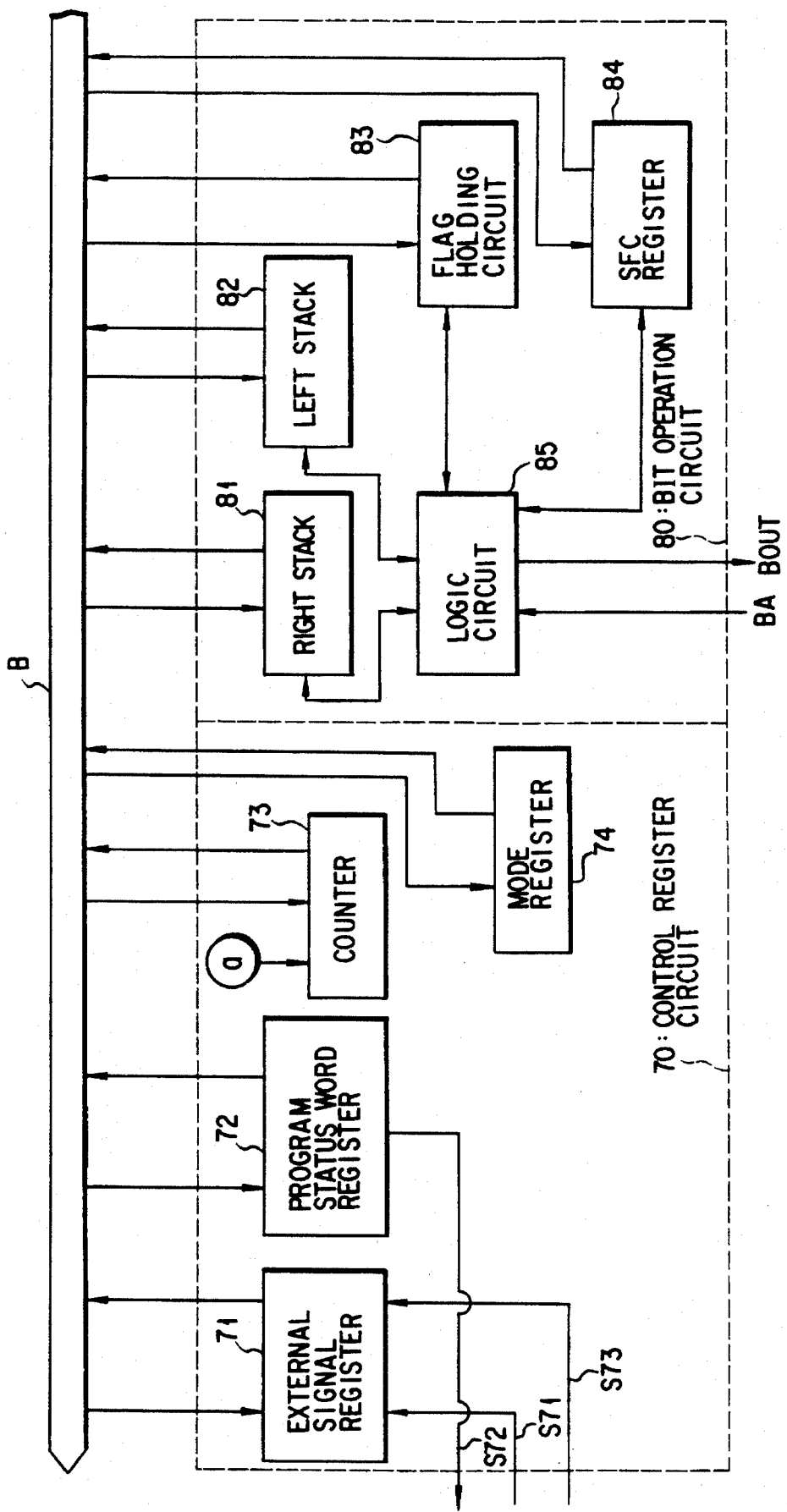
FIG. 12 is a block diagram showing the detailed arrangement of still another part of the controller shown in FIG. 3.

(7) Control Register Circuit 70 (FIG. 12)

The control register circuit 70 includes an external signal register 71, a program status word register 72, a counter 73, and a mode register 74.

The external signal register 71 has a function of storing an abnormal state such as an interrupt or an error and generates an interrupt or trap signal. The interrupt signals include an address matching interrupt signal, a trace interrupt signal, a stack overflow interrupt signal, and a floating-point invalidation operation, in addition to the plurality of interrupt signals externally supplied through the interrupt signal line S71.

When the external signal register 71 receives any one of the interrupt signals, the external signal register 71 supplies the interrupt generation signal INT to the address generator 14 in the sequencer 10. At the same time, upon generation of this interrupt generation signal INT, the flow jumps to microaddress 5 as soon as the current instruction is completed, thereby performing interrupt processing.

If a parity error, a "no answer" error, or a range error of the code memory CM occurs, the error signal is supplied from the IB register 42 to the external signal register 71 and is stored therein. The error signal is sent out to the address generator 14 as the code error signal CDER. When a code read out from the code memory CM is executed, the flow does not advance to the corresponding microaddress but jumps to microaddress 6 to perform error processing. In this error processing, the content at the address in the program counter (PC) 33 is read out and written in the program counter (APC) 31. A code in which an error occurred is read out again. At this time, the operation repetition count is predetermined, and a temporary error can be prevented by re-reading the code within the predetermined operation repetition count. In addition, an error generation address, an error content, an error count, and a generation time are stored for the subsequent diagnosis.

When a parity error, "no answer" error, or range error of the data memory DM occurs, the error is similarly stored in the external signal register 71. The external signal register 71 immediately generates the trap generation signal TRAP, and the flow jumps to microaddress 4. At this time, data access is performed again. In order to interrupt the operation and restore the state before data access, a memory inhibit signal is generated not to update the storage contents of the various registers. The current microaddress is stored in the microstack 13 of the sequencer 10 so as to unload it upon the reexecution of the corresponding instruction. An error generation address, an error generation time, and an error generation count are stored to check whether the count falls within the predetermined range in the operations from microaddress 4. If so, the stack of the microstack 13 is popped to read out the data so as to access the data again, and the flow jumps to the corresponding address. When the count exceeds the predetermined count, the error is not a temporary error. In this case, the error is stored, and necessary processing is performed.

The program status word register 72 has bits for designating inhibition of various interrupt traps, indicating a state representing an in-operation state of the instruction for allowing an interrupt during the execution of an instruction which requires a long execution time, indicating a state in which the previous instruction is a prefix instruction, designating a task level by means of a plurality of bits, and indicating any other program state. Some of the above bits are externally output through a signal line S72.

The interrupt trap is allowed by the program status word register 72.

If an instruction is a special instruction which requires a long execution time, and when a status flag representing that the instruction is being executed is set, processing continues by using the in-operation state stored in general registers (GR) 91 in the register circuit 90. An example of such an instruction is a transfer instruction for transferring a memory content from a given address to another address range. Although the word address WA shown in FIG. 2 can include an index modifier within one word (type 3), the bit address requires an additional four bits because the bit address requires a bit position within the word. As a result, these four bits cannot be included in one word like the instruction word as the type 1. The index is therefore defined as another instruction like the instruction word as the type 2. Since the instruction word as the type 2 is located immediately before the instruction word as the type 1, the instruction as the type 2 is also called a prefix instruction. When the bit instruction of an instruction as the type 1 is read out, it is determined by the status flag representing the prefix instruction whether an index modifier instruction of the instruction word as the type 2 is present immediately before this bit instruction.

The programmable controller program is divided into a plurality of tasks. The tasks serve as independent execution units. The tasks have levels corresponding to priorities. The level of the current task is held in the program status word register 72 and is also externally output. A task having the highest priority, i.e., the highest level, is a programmable controller program processed in an interrupt mode. The programmable controller program has a plurality of levels in a normal state. When a task having a higher level than that of the current task is required, the current task stores the content of the program status word register 72, and control is shifted to a new task.

The counter 73 counts the number of instructions and the number of repeated instructions such as "ADDF, 1" at address 23 in FIG. 6. In the latter case, since the repetition count is designated by the IB register 42, this count is measured. Otherwise, a count is input from the data bus B and measured.

The mode register 74 designates an operation mode of the address matching circuit 60, and selects the presence/absence of rounding in a floating-point operation. The control register circuit 70 includes a control circuit for generating the interrupt generation signal INT and the trap generation signal TRAP.

(8) Bit Operation Circuit 80 (FIG. 12)

The bit operation circuit 80 comprises a right stack 81, having a one-bit width and a 16-bit depth, for holding the right-side state of the contact (FIG. 5) for the subsequent operation in accordance with a bit address or state BA read out from the data memory DM through the BA signal line S55, a left stack 82 for holding the left-side state of the contact in the same manner as in the right stack 81, a flag holding circuit 83 for holding a bit operation result, an SFC register 84 for holding an SFC bit operation result, and a logic circuit 85 for exchanging data with the right stack 81, the left stack 82, the flag holding circuit 83, and the SFC register 84 to perform a bit operation. The operation result of the logic circuit 85 is written as the signal BOUT in the data memory DM through the data memory control circuit 50.

The flag holding circuit 83 includes flip-flops for storing the states of the signal BOUT for holding the bit output, operation auxiliary signals S1FF, S2FF, and S3FF, the bit jump signal JFF for invalidating a bit operation, the word jump signal JWFF for invalidating a word operation, and a master controller signal MCFF representing the state of the left bus. These flip-flops are used in the bit operation shown in FIGS. 4A and 4B.

The SFC register 84 comprises eight bit operation flip-flops used for the SFC. The operation is performed in the logic circuit 85.

(9) Register Circuit 90 (FIG. 13)

The register circuit 90 holds the intermediate results in word operations and various data. The register circuit 90 comprises three types of registers, i.e., the general registers (GR) 91 consisting of 32 32-bit registers for address calculation values in index modification and other various values, and a 32-bit word right stack (WRS) 92 and a 32-bit word left stack (WLS) 93 which are arranged for a word to correspond to the stacks 81 and 82. Since the stacks 92 and 93 are constituted by a register file, stack pointers 94 and 95 for designating stack positions are respectively connected to the stacks 92 and 93.

The stacks or registers 91 to 93 are defined by dividing a register file consisting of 64 registers. For example, the first forty registers are used as the general registers 91, the next sixteen registers are used as the word right stack (WRS) 92, and the remaining eight registers are used as the word left stack (WLS) 93. At the same time, the register file can have a 3-port arrangement in which two read operations and one write operation are simultaneously performed. For example, using a pipeline, two different locations of the word right stack (WRS) 92 are accessed for an operation, and the operation result can be written in the word right stack (WRS) 92, thereby completing the operations equivalently in one step. In a word operation, the data stacked on each stack are operated, the operation result is stored in the stack, and finally the result is written in an external memory. That is, operations can be performed between the stacks 92 and 93.

An application example of the word right stack (WRS) 92 will be described below.

The stack pointer 94 starts calculating the register address from the register address of the stack top in accordance with the instruction so as to access four registers, i.e., (WRS), (WRS−1), (WRS−2), and (WRS−3) continuously from the stack top if the stack top is defined as (WRS). The operation result is stacked on the present stack top, i.e., written in (WRS+1). Alternatively, the data of the current stack top (WRS) is removed, and the operation result is written therein; the data of the registers (WRS) and (WRS−1) is removed, and the operation result is written therein; or the data of the registers (WRS), (WRS−1), and (WRS−2) are removed, and the operation result is written therein. One of the above four operations is selected by the word right stack (WRS) 92. In the write mode, the stack pointer 94 calculates and stores the address of a new stack top and prepares for the next operation. In fine, the stack pointer 94 calculates the addresses for the four types of registers selected from the constantly changing stack top position and informs it to the word right stack (WRS) 92 through a signal line.

Since the word left stack (WLS) 93 has a small number of registers, the operation result is stacked on only the stack top (WLS) in the read mode, and the operation result is stacked on the stack top (WLS) and the stack top (WLS+1) in the write mode. These calculations are performed in the stack pointer 95 as in the stack pointer 94. The calculation results are informed to the word left stack (WLS) 93 through the signal line.

The general registers (GR) 91 can be used to hold the operation result and the intermediate result data in place of the stack.

(10) Fixed-Point Operation Circuit A0 and Multiplier Circuit C0 (FIG. 13)

The fixed-point operation circuit A0 has a function of performing 16- and 32-bit four operations and a shift operation. The fixed-point operation circuit A0 performs operations with an assistance of the multiplier circuit C0 (to be described in detail later) in a multiplication mode. One of the features of the fixed-point operation circuit A0 is an arrangement in which the limiter prevents an overflow of the operation results. When an overflow occurs, the processing time is undesirably prolonged, and it is not suitable for a floating-point operation as an application of this controller. With this feature, the operation can be processed within a constant processing time, thereby maintaining a constant response time in real-time applications.

The fixed-point operation circuit A0 includes latches (L) A1 and A2 for latching operation data sent from the data bus B, an arithmetic and logic circuit (ALU) A3 for performing operations using the data latched by the latches (L) A1 and A2, a limiter A4 for limiting the operation result of the arithmetic and logic circuit (ALU) A3 with the upper and lower limits, a barrel shifter A5 for holding the operation data from the data bus B, a selector A6 for selecting outputs from the limiter A4 and the barrel shifter A5 in accordance with the types of operations, a pipeline register (PL) A7 for holding a fixed-point operation result of the data selected by the selector A6, and a flag register A8.

The arithmetic and logic circuit (ALU) A3 performs various numerical operations (e.g., an addition, a subtraction, an absolute value operation, and a complement operation), logic operations (e.g., logical OR and logical AND), and a division. The division is performed in accordance with a subtraction/addition method. According to this method, the addition or subtraction in the arithmetic and logic circuit (ALU) A3 is determined in accordance with the sign of a partial remainder as the operation result at the preceding digit position. An auxiliary circuit (not shown in FIG. 13) holds and shifts the partial remainder and holds the sign of the division result.

The barrel shifter A5 performs a logical shift, an arithmetic shift, and rotation.

The multiplier circuit C0 is commonly used by the fixed-point operation circuit A0 and the floating-point operation circuit B0 (to be described in detail later) to reduce the chip size. The selector A6 is arranged to switch between the fixed-point operation circuit A0 and the floating-point operation circuit B0. The multiplier circuit C0 comprises selectors C1 and C2 for respectively selecting the fixed-point operation circuit A0 and the floating-point operation circuit B0, and a multiplier C3 for multiplying outputs from the selectors C1 and C2. At the same time, an output from the multiplier C3 is sent to the fixed-point operation circuit A0 and the floating-point operation circuit B0. The multiplier C3 performs a multiplication of 16 bits × 16 bits and outputs a 32-bit product in a fixed-point operation, and performs a multiplication of 24 bits × 24 bits and outputs a 24-bit product in a floating-point operation.

This programmable controller performs pipeline processing. The operation result is held in the barrel shifter A5 serving as the pipeline register described above. In the next cycle, the data is shifted to the final destination. The final destination is normally the register circuit 90. That is, the processing time from the fixed-point operation circuit A0 to the final target can be equivalently reduced by the pipeline to a negligible degree to allow a high-speed operation. The next microinstruction reads out data as if the data is present although the data is actually absent in the final destination. For this purpose, data is output from the pipeline register to the data bus B in place of the final destination. Similar circuits are also arranged in the internal registers of the pipeline register B1 in the floating-point operation circuit B0 and the memory data read register 52 in the data memory control circuit 50.

A flag signal SA1 of the operation result of the fixed-point operation circuit A0 is held in the flag register A8. This flag register A8 also holds a flag signal SB1 of the floating-point operation circuit B0.

(11) Floating-Point Operation Circuit B0 (FIG. 13)

The floating-point operation circuit B0 performs additions and subtractions, and comparison, absolute value, and complement operations based on the additions and subtractions. The multiplier circuit C0 calculates a mantissa for a multiplication, and the floating-point operation circuit B0 calculates an exponent for this multiplication. A mantissa for a division is calculated by the division operation portion in the fixed-point operation of the fixed-point operation circuit A0, and an exponent for this division is calculated by the floating-point operation circuit B0. The exponent and mantissa are separately calculated in the floating-point operation as described above.

In the floating-point operation circuit B0, data sent from the data bus B is stored in the latches (L) B2 and B3. The floating-point operation circuit B0 employs the IEEE standards to facilitate data exchange with other circuits. In this case, since the most significant bit of the mantissa is hidden, the most significant bit is restored. The mantissa and the sign are supplied to a digit position matching circuit B4 for calculating the mantissa and the multiplier circuit C0. In addition, the exponent is supplied to an exponent adder/subtracter B5 and a selector (SEL) B6. The exponent and the mantissa are supplied to a comparator B7. The comparator B7 receives the exponent and the mantissa and compares the absolute values of these inputs to determine one of the exponent and mantissa as a value to be shifted for digit position matching in an addition or subtraction using the comparison result signal.

The exponent adder/subtracter B5 calculates the number of digit positions to be shifted in an addition or subtraction and supplies the calculated value to the digit position matching circuit B4. The exponent of the product or quotient in a multiplication or division is calculated by an addition or subtraction of the exponents and is supplied to the selector (SEL) B6. Since the exponent of the sum or difference in an addition or subtraction is the exponent of the larger absolute value, the result from the comparator B7 is not selected, but the output from the exponent adder/subtracter B5 or the outputs from the latches (L) B2 and B3 are selected. An output from the selector (SEL) B6 is supplied to the rounding normalization correction circuit B8. In the rounding normalization correction circuit B8, since an increase or decrease in exponent occurs due to a carry or borrow in the mantissa operation result, correction of the increase/decrease, the operation for correcting the exponent biased in accordance with the IEEE standards, and correction of the exponent produced by rounding the mantissa are performed. An output from the rounding normalization correction circuit B8 is sent to the pipeline register B1.

An arithmetic and logic circuit (ALU) B9 calculates a signal representing a digit position matched state in an addition or subtraction except for a multiplication or division in the mantissa operation. The resultant signal is supplied to a rounding normalization circuit B11 through a selector (SEL) B10. The rounding normalization circuit B11 employs rounding of the latest value and adds the values to perform rounding. If the digit position is required to be shifted to correct the exponent upon this rounding or calculation of the arithmetic and logic circuit (ALU) B9 for normalization, the digit position is shifted. The rounded value is also sent to the rounding normalization correction circuit B8 to calculate the exponent. Outputs from the rounding normalization circuit B11 are a normalized numeric value and a sign. In this case, a "denormal" number (non-normalized value) is set to zero. The output as the exponent operation result from the rounding normalization correction circuit B8 is data added with a bypass component so as to comply with the IEEE standards. The sign, the mantissa, and the exponent are systematically stored in the pipeline register B1. The pipeline register B1 has the same function as those of other pipeline registers. The sign, the mantissa, and the exponent are sent to the data bus B.

In a multiplication, after the mantissa product is obtained from the multiplier circuit C0, the product is sent to the rounding normalization circuit B11 and the rounding normalization correction circuit B8 through the selector (SEL) B10 to perform rounding and normalization. In this case, the exponent is subjected to an addition. In a division, the mantissa is divided in the fixed-point operation circuit A0. Although not shown, the quotient is supplied to the selector (SEL) B10 to perform the same processing as in a multiplication. The exponent is subjected to a subtraction.

The operation of the apparatus described above according to this embodiment will be described with reference to FIGS. 14 and 15. FIGS. 14 and 15 are timing charts showing the processing conditions of part of the program in FIGS. 4A to 8. FIG. 14 shows a bit operation, while FIG. 15 shows a floating-point operation. Reference symbols t1, t2, . . . denote timings. Numbers 0, 1, 2, . . . correspond to the addresses of the code memory CM. As is apparent from FIGS. 14 and 15, a code at address 0, i.e., an instruction, is executed by simultaneously operating constituent elements.

The bit operation in FIG. 14 will be described below. Address 0 of the code memory CM is accessed from the program counter (APC) 31 through a code bus S31, and the code at address 0 of the code memory CM is read out through the code bus S41. Taking address 0 as an example, the program counter (APC) 31 designates address 0 at time t1, and the code at this address 0 is read out and stored in the IB register 42 at time t2. The microinstruction S12 corresponding to this code is read out from the microbus S12. Then, the program counter (APC) 31 designates the next address 1 to access address 1 of the code memory CM, thereby reading out the code at address 1. At this time, address 0 is held in the program counter (BPC) 32 because the address of the current code is required to check for an interrupt and address matching.

At time t3, the code is processed in accordance with the readout microinstruction. That is, data at the bit address x1, which is represented by the code, is read out from the data bus. The content of the program counter (BPC) 32 is transferred to the program counter (PC) 33, and the content of the IB register 42 is transferred to the IR register 43.

At time t4, a bit operation is performed using the data read out from the data memory DM through the data bus S51. The previous microinstruction is stored, and a command is supplied to the bit operation circuit 80. The content of the program counter (PC) 33 is transferred to the program counter (DPC) 34, and the content of the IR register 43 is transferred to the ID register 44. In this manner, the basic processing is performed in steps at four timings, thus achieving a 4-stage pipeline scheme.

Time t5 represents a case in which data bus access is delayed, and the access is completed in two cycles. The code read out from the code memory CM is stored in the IA register 41 because the registers from the IB register 42 cannot perform shift operations.

Time t7 and time t8 represent a case in which the code bus access is delayed. Since no new code is input, an invalid instruction NOP is stored in the IB register 42. Since the above data and code bus delays do not occur in a normal operation, three buses (S11, S12), (S31, S41), (S51, S52) always allow continuous data write and read operations.

The floating-point operation (FIG. 15) will be described below. Since most of the instructions in the floating-point operations end within one cycle, processing is similar to that in FIG. 14, but the execution time of the instruction in the floating-point operation is long. The addition, subtraction, and multiplication at addresses 23, 25, and 27 require a 2-cycle period. TWO additions are performed during a time interval between time t4 and time t7. Since each operation requires two cycles, a total of four cycles must be waited. This state is shown in FIG. 15. The same operations as described above are performed at time t9, time t10, time t12, and time t13. For an instruction requiring two cycles, two microinstructions are read out and processed. In a case wherein the content is read out twice as at address 23, the sequencer 10 causes the microstack 13 to store the start address, and this start address is used for the second time.

With the arrangement of this embodiment, the following effects are obtained.

(1) The arrangement can be simplified by a systematic instruction system.

All the instructions have a fixed length, e.g., a 32-bit length. In a bit operation instruction which is frequently used and required to be executed at high speed, an operation code and a bit address are inserted in one word. Other various operation instructions to be performed in units of words are classified into data load instructions, data store instructions, and normal operation instructions. Various addressing modes including a mode using an immediate value can be set for only the data load and store instructions. Only operations of a plurality of stacks are performed for the normal operation instruction, so that the normal operation instruction need not have a word address, an immediate value, and an index, which require a larger number of bits in one word. The number of types of instructions can be smaller than the number of types of addressing modes. Therefore, a large number of operation instructions can be contained within one word, and a large number of necessary high-performance instructions can be incorporated. On the other hand, since the instruction system and hence the logic are simplified, hardware can be made compact and can be operated at high speed. Two types of tasks are provided to store the operation data and branch the operation result into a plurality of portions so as to obtain a good correspondence with graphic representations.

(2) Hardware can be made compact and operated at high speed.

Since the main constituent circuits of the programmable controller can be integrated on one chip, high-speed data exchange can be performed between the constituent circuits through the internal bus B. Control signals which cannot be transmitted through the data bus B are directly coupled to the respective constituent circuits.

In the conventional controller, ICs are required as buffers to connect a plurality of chips, so that the volume of hardware is increased. As a result, the number of connecting points must be made small, and high-speed operations are difficult.

In the controller according to the present invention, since the internal data bus B is commonly connected to the bit operation circuit 80, the fixed-point operation circuit A0, the floating-point operation circuit B0, and the register circuit 90, a pipeline arrangement can be obtained. Even in a comparison instruction (e.g., two numbers are compared, and a comparison result is stored in a bit register) wherein a bit operation and a fixed- or floating-point operation are simultaneously performed, the mutual connection can be systematically performed without any time delay. Even if the type of operation is changed, no overhead is imposed. For example, the floating-point operation circuit B0 may comprise a pipeline register for changing the floating point into the fixed point and performing a fixed-point operation without causing any delay in switching between the floating point and the fixed point. Although the multiplier circuit C0 including the multiplier C3 has a large circuit size, it can be integrated on a single chip and can be commonly used in both fixed- and floating-point operations.

As described above, most of the circuits can be integrated on a single chip, the circuit size can be reduced, and a high-speed, inexpensive programmable controller can be realized.

(3) Reduction in Instruction Steps

When the operation repetition count is designated in a normal operation instruction, the same operation can be repeated a plurality of number of times to reduce the instruction steps and establish a good correspondence with graphic representations.

(4) Reexecution upon Occurrence of Error

Upon occurrence of an error in the code memory CM or the data memory DM, a highly reliable programmable controller cannot be obtained by only detecting the occurrence of the error. That is, when an error occurs, the stored operation result should not be broken by the error data. In addition, the operation must be continued by reexecution if the error is a transient error. Since a pre-read operation of the code memory is performed, an interrupt is detected during execution of the readout code. For this reason, it is difficult to reexecute processing without breaking the stored operation result.

In the controller of the present invention, since a signal for inhibiting updating of the storage content is output upon detection of a memory error, data destruction and a transient error can be prevented.

The present invention is not limited to the particular embodiment described above.

As an improvement of the register circuit 90, it may have a plurality of registers corresponding to, e.g., different levels. The register content must generally be saved upon generation of an interrupt, and the save time must be shortened. When the save time is shortened, the response speed is increased. The tasks have levels.

More specifically, the program of the programmable controller is divided into several tasks. These tasks are leveled into an interrupt task, a high-speed task, a middle-speed task, and a low-speed task in accordance with the types of tasks. Tasks having the same levels do not have any priority. However, in tasks having different levels, they have higher priority levels in an order of the interrupt task, the high-speed task, the middle-speed task, and the low-speed task. When an interrupt is generated or a real-time operation is set by a clock interrupt, control is shifted to a task having a higher priority level, and the current task is interrupted. If general registers and stacks are provided in the register circuit 90 in units of levels, the data therein need not be saved or loaded. Within the same level, when one task is completed, the next task is executed. The save and loading times can be omitted. Since a larger number of elements can be incorporated within one chip along with the technical developments, the above arrangement can be easily achieved in the near future. If tasks having four levels are used, the overhead can be reduced by even two sets of registers. In this manner, a plurality of registers may be arranged if hardware limitations are present.

With the above arrangement, therefore, stacks and general registers are provided in units of tasks to shorten the task switching time, thereby providing a programmable controller having a high response speed.

In addition, the micro-ROM can be incorporated in the integrated central processing unit A. The micro-ROM is externally added to reduce the chip size and facilitate changes in microprograms. The micro-ROM can be easily incorporated in the central processing unit A when a future technical advance is achieved or an inexpensive EEPROM element becomes easily accessible.

In addition, a fuzzy function can be realized by a combination of numerical operations, as is apparent to those skilled in the art. In the present invention, a microprogram can be written to use the function of the central processing unit of the present invention and to efficiently process a complicated operation, thereby realizing various new functions such as a fuzzy function within a short period of time. In particular, a floating-point operation is effective because an overflow need not be taken into consideration.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A programmable controller for executing a predetermined instruction, comprising:

a microprogram memory for holding a microinstruction to execute the predetermined instruction;

a code memory for holding at least one operation instruction for executing an operation in accordance with the operation instruction having a predetermined bit length;

a data memory for holding data to be processed by the operation instruction; and an integrated central processing unit connected to the microprogram memory, code memory and data memory for analyzing said operation instruction held in the code memory and for executing the operation of the data held in said data memory by the programmable controller based on the microinstruction held in the microprogram memory;

wherein said central processing unit includes:

a sequencer for designating an address of said microprogram memory and reading out a microinstruction at the designated address;.

a decoder for decoding the microinstruction read out by said sequencer and supplying an operation command to constituent circuits of said programmable controller;

a program counter circuit having a plurality of counters, for holding a next address, a current address, and a previous address for said code memory;

an instruction register circuit having a plurality of registers corresponding to addresses of said program counter circuit, for holding an instruction of said code memory and an abnormal state;

a data memory control circuit for writing/reading the data to be processed by the operation instruction in/from said data memory based on the instruction read out from said instruction register circuit;

an address matching circuit for determining address states of said code memory and said data memory;

a control register circuit for receiving an interrupt signal or an abnormal signal from said code memory or said data memory and sending out the state of said code memory or said data memory to said sequencer and a predetermined constituent circuit;

a bit operation circuit for executing a bit operation on the basis of the instruction from said code memory and holding a calculation result of the bit operation;

a register circuit for holding intermediate data in a word operation and intermediate data in other operations;

a multiplier circuit for performing a multiplication operation;

a fixed-point operation circuit for executing a fixed-point operation, a logical operation, and a digit position shift operation by using said multiplier circuit based on the instruction from said code memory; and a floating-point operation circuit for executing a floating-point operation using said multiplier circuit based on the instruction from said code memory.

2. A programmable controller for executing a predetermined instruction, comprising:

a code memory for holding at least one operation instruction for executing an operation in accordance with the operation instruction having a predetermined bit length;

a data memory for holding data to be processed by the operation instruction; and an integrated central processing unit connected to the code memory and data memory, and having a microprogram memory for holding a microinstruction, and for analyzing said operation instruction held in the code memory and for executing the operation of the data held in said data memory by the programmable controller based on the microinstruction held in the microprogram memory;

wherein said central processing unit includes:

a sequencer for designating an address of said microprogram memory and reading out a microinstruction at the designated address;

a decoder for decoding the microinstruction read out by said sequencer and supplying an operation command to constituent circuits of said programmable controller;

a program counter circuit having a plurality of counters, for holding a next address, a current address, and a previous address for said code memory;

an instruction register circuit having a plurality of registers corresponding to addresses of said program counter circuit, for holding an instruction of said code memory and an abnormal state;

a data memory control circuit for writing/reading the data to be processed by the operation instruction in/from said data memory based on the instruction read out from said instruction register circuit;

an address matching circuit for determining address states of said code memory and said data memory;

a control register circuit for receiving an interrupt signal or an abnormal signal from said code memory or said data memory and sending out the state of said code memory or said data memory to said sequencer and a predetermined constituent circuit;

a bit operation circuit for executing a bit operation on the basis of the instruction from said code memory and holding a calculation result of the bit operation;

a register circuit for holding intermediate data in a word operation and intermediate data in other operations;

a multiplier circuit for performing a multiplication operation;

a fixed-point operation circuit for executing a fixed-point operation, a logical operation, and a digit position shift operation by using said multiplier circuit based on the instruction from said code memory; and a floating-point operation circuit for executing a floating-point operation using said multiplier circuit based on the instruction from said code memory.

3. A controller according to either one of claims 1 or 2, wherein said sequencer includes:

a microprogram counter for holding an address for addressing said microprogram memory;

an incrementer for increasing the address of said microprogram counter by one at a time;

a microstack for storing a subroutine of the microinstruction and a return address in repetition processing; and an address generator for generating a predetermined fixed address corresponding to the microinstruction.

4. A controller according to either one of claims 1 or 2, wherein said decoder includes:

a current microinstruction decoder for decoding a microinstruction to be executed at a next step and outputting a control signal; and a next microinstruction decoder for decoding a current microinstruction and outputting a control signal.

5. A controller according to either one of claims 1 or 2, wherein said control register circuit includes:

means for causing said programmer counter circuit to execute a re-read operation of said code memory within a predetermined operation repetition count upon reception of the interrupt or abnormal signal from said code memory or said data memory; and means for causing said sequencer to inhibit updating of storage data of said plurality of registers in the instruction register circuit of respective constituent circuits upon reception of the interrupt or abnormal signal from said data memory.

6. A controller according to either one of claims 1 or 4, wherein said register circuit includes:

a plurality of word operation stacks and a plurality of general registers; and means for switching between said word operation stacks and said general registers in accordance with a level of a task.

* * * * *